United States Patent
Wood et al.

(10) Patent No.: US 7,404,840 B2
(45) Date of Patent: Jul. 29, 2008

(54) CHEMICALLY STABILIZED β-CRISTOBALITE AND CERAMIC BODIES COMPRISING SAME

(75) Inventors: Thomas E. Wood, Stillwater, MN (US); Zhongshu Tan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 433 days.

(21) Appl. No.: 10/483,035

(22) PCT Filed: Jul. 3, 2002

(86) PCT No.: PCT/US02/21333

§ 371 (c)(1),
(2), (4) Date: May 28, 2004

(87) PCT Pub. No.: WO03/004438

PCT Pub. Date: Jan. 16, 2003

(65) Prior Publication Data

US 2004/0231307 A1   Nov. 25, 2004

(51) Int. Cl.
*B01D 39/20* (2006.01)
*B01D 46/00* (2006.01)
*C03C 10/14* (2006.01)

(52) U.S. Cl. ........................ 55/523; 55/282.3; 55/385.3; 55/527; 55/DIG. 5; 55/DIG. 10; 55/DIG. 30; 501/4; 501/54; 501/70; 501/133; 501/154; 264/628; 264/679; 264/DIG. 48

(58) Field of Classification Search .................... 55/523, 55/527, DIG. 5, DIG. 10, DIG. 30, 385.3, 55/282.2, 282.3; 501/4, 54, 70, 133, 154; 264/679, 628, DIG. 48

See application file for complete search history.

(56) References Cited

U.S. PATENT DOCUMENTS 3,112,184 A   11/1963   Hollenbach (Continued)

FOREIGN PATENT DOCUMENTS

EP   0 307 716 A1 *   3/1989

(Continued)

OTHER PUBLICATIONS

Grim, R.E. and Kulicki, Georges, "Montmorillonite: High Temperature Reactions and Classification," The American Mineralogist, vol. 46, Nov.-Dec. 1961, University of Illinois, Urbana, Illinois, pp. 1329-1369.

(Continued)

*Primary Examiner*—Jason M Greene
(74) *Attorney, Agent, or Firm*—Harold C. Knecht, III

(57) ABSTRACT

A method for rigidifying a fiber-based paper substrate for use in the exhaust system of a combustion device. In the method, a green ceramic fiber-based paper substrate is impregnated with an impregnating dispersion. The impregnated substrate is then dried, calcined and fired to form a rigidified substrate that is suitable for use in the exhaust system of a combustion device. This rigidification process is performed at least once and, preferably, two or more times. The green paper substrate comprises two or more sheets of green ceramic fiber-based paper, with at least one creased sheet and another sheet being a laminated together to form a plurality of tubular channels. The rigidified substrate comprises refractory ceramic fibers in the form of a ceramic fiber-based paper and agglomerates of ceramic particles. The ceramic particle agglomerates are bonded to and disposed so as to thereby bond together the refractory ceramic fibers at spaced locations along and at intersections of the refractory ceramic fibers so that the refractory ceramic fibers retain much of their original flexibility while in the paper.

35 Claims, 7 Drawing Sheets

U.S. PATENT DOCUMENTS

| | | |
|---|---|---|
| 3,146,197 A | 8/1964 | Getzin |
| 3,445,252 A | 5/1969 | MacDowell |
| 3,458,329 A | 7/1969 | Owens et al. |
| 3,702,279 A | 11/1972 | Ardary et al. |
| 3,869,282 A | 3/1975 | Curran et al. |
| 3,899,555 A | 8/1975 | Takao et al. |
| 4,073,655 A * | 2/1978 | Li .................................. 501/4 |
| 4,081,371 A | 3/1978 | Yarwood et al. |
| 4,276,071 A | 6/1981 | Outland |
| 4,390,355 A | 6/1983 | Hammond et al. |
| 4,409,931 A | 10/1983 | Lindberg |
| 4,421,599 A | 12/1983 | Kuzuoka et al. |
| 4,608,361 A | 8/1986 | Kanamori et al. |
| 4,652,286 A | 3/1987 | Kusuda et al. |
| 4,718,926 A | 1/1988 | Nakamoto et al. |
| 4,808,559 A * | 2/1989 | Sommer et al. ............... 502/63 |
| 4,818,729 A * | 4/1989 | Perrotta et al. ................. 501/4 |
| 4,828,774 A | 5/1989 | Andersson et al. |
| 4,968,467 A | 11/1990 | Zievers |
| 4,977,111 A | 12/1990 | Tong et al. |
| 5,077,089 A | 12/1991 | Otto |
| 5,078,818 A | 1/1992 | Han et al. |
| 5,096,857 A * | 3/1992 | Hu et al. ....................... 501/54 |
| 5,145,659 A * | 9/1992 | McWilliams ............... 423/713 |
| 5,153,295 A | 10/1992 | Whitmarsh et al. |
| 5,194,078 A | 3/1993 | Yonemura et al. |
| 5,194,414 A | 3/1993 | Kuma |
| 5,208,195 A * | 5/1993 | Schlueter et al. .............. 502/63 |
| 5,223,195 A | 6/1993 | Kuwabara |
| 5,260,125 A | 11/1993 | Copes |
| 5,306,554 A | 4/1994 | Harrison et al. |
| 5,322,537 A | 6/1994 | Nakamura et al. |
| 5,369,063 A | 11/1994 | Gee et al. |
| 5,380,580 A | 1/1995 | Rogers et al. |
| 5,433,902 A | 7/1995 | Leyderman |
| 5,476,684 A | 12/1995 | Smith |
| 5,488,017 A | 1/1996 | Szweda et al. |
| 5,601,674 A | 2/1997 | Szweda et al. |
| 5,780,126 A | 7/1998 | Smith et al. |
| 5,849,375 A | 12/1998 | Smith et al. |
| 5,955,177 A | 9/1999 | Sanocki et al. |
| 5,993,192 A | 11/1999 | Schmidt et al. |
| 6,190,162 B1 | 2/2001 | Smith et al. |
| 6,231,639 B1 | 5/2001 | Eichenmiller et al. |
| 6,294,125 B1 | 9/2001 | Bridgewater et al. |
| 6,331,233 B1 | 12/2001 | Turner |
| 6,397,603 B1 | 6/2002 | Edmondson et al. |
| 6,444,600 B1 | 9/2002 | Baek et al. |
| 6,582,490 B2 | 6/2003 | Miller et al. |
| 6,702,650 B2 | 3/2004 | Adefris |
| 6,881,699 B1 * | 4/2005 | Sakuth et al. ............... 502/214 |
| 2001/0029843 A1 | 10/2001 | Minoru et al. |
| 2002/0079604 A1 | 6/2002 | Davis et al. |
| 2002/0086165 A1 | 7/2002 | Davis et al. |
| 2002/0088214 A1 | 7/2002 | Sherwood |
| 2002/0088599 A1 | 7/2002 | Davis et al. |
| 2002/0117253 A1 | 8/2002 | Hanse |
| 2003/0165638 A1 | 9/2003 | Louks et al. |
| 2004/0132607 A1 | 7/2004 | Wood et al. |
| 2004/0231307 A1 | 11/2004 | Wood et al. |

FOREIGN PATENT DOCUMENTS

| | | |
|---|---|---|
| GB | 1 424 126 | 2/1969 |
| GB | 1 360 197 | 7/1974 |
| GB | 1 360 198 | 7/1974 |
| GB | 1 360 199 | 7/1974 |
| GB | 1 360 200 | 7/1974 |
| GB | 1 440 184 | 6/1976 |
| GB | 1 502 373 | 3/1978 |
| JP | 05-157214 | 6/1993 |
| WO | WO 93/25499 | 12/1993 |
| WO | WO 95/19943 | 7/1995 |
| WO | WO 98/33013 | 8/1998 |
| WO | WO 99/52838 | 10/1999 |
| WO | WO 03/097213 A1 | 11/2003 |

OTHER PUBLICATIONS

Database WPI, Section Ch, Week 199916, Derwent Publications Ltd., London, GB, An 1999-184394 & JP 11 033413, Feb. 9, 1999, abstract.

U.S. Appl. No. 10/738,447, filed Dec. 16, 2003, "Ceramic Fiber Composite and Method for Making the Same" (Wood et al.).

U.S. Appl. No. 10/325,001, filed Dec. 20, 2002, "High Temperature Nanofilter System and Method" (Liu et al.).

Kirk-Othmer Encyclopedia of Chemical Technology, 4$^{th}$ Ed., vol. 6, John Wiley & Sons, New York, NY, p. 405.

ASTM D737-75.

Grim et al., "Montmorillonite: High Temperature Reactions and Classifications", *The American Mineralogist*, vol. 46, 1961, pp. 1329-1369.

Kulbicki, "High Temperature Phases in Montmorillonites", *Clays and Clay Minerals*, vol. 566, 1958, pp. 144-158.

* cited by examiner

CHEMICALLY STABILIZED β-CRISTOBALITE AND CERAMIC BODIES COMPRISING SAME

FIELD OF THE INVENTION

The invention relates to inorganic fiber substrates for use in an exhaust system, in particular, to such exhaust system substrates that include a wall-flow substrate and/or a flow-through substrate, more particularly, to such substrates useful for filtering, regenerating and/or reducing the emissions from an exhaust system and, even more particularly, to such substrates for use in the exhaust system of an internal combustion engine. The invention also relates to devices incorporating such substrates and methods of making such substrates.

BACKGROUND OF THE INVENTION

Internal combustion engines (e.g., vehicle engines, power generators, etc.), power plants, incinerators and other such combustion devices typically include exhaust systems which expel the products of a combustion process. Such exhaust systems typically include some form of flow-through catalyzing substrate and/or wall-flow filter substrate. These combustion products can include non-combusted and/or partially combusted byproducts such as, for example, soot particles, carbon monoxide, $NO_x$, etc. Exhaust systems are typically designed so as to limit the release of such combustion byproducts into the atmosphere.

Particulate soot combustion byproducts have been found to pose health hazards to humans and the environment. As a result, the exhaust of such soot particles has received particular attention. In response to such concerns, increasingly strict governmental regulations have been and are being promulgated to restrict and reduce the exhaust emissions from sources such as internal combustion engines and, in particular, diesel engines. Therefore, additional attention has been directed toward the development of more efficient exhaust systems capable of further restricting and reducing the release of such combustion byproducts and, in particular, of filtering particulate laden exhaust gases.

A number of combustion devices (e.g., diesel engines) produce both undesirable gaseous (e.g., carbon monoxide) and particulate (e.g., soot) combustion byproducts. The exhaust systems of such engines are usually designed with a catalytic and a filter component for limiting the exhaust of both types of combustion byproducts. Catalytic converters typically include a flow-through catalyzing substrate that has a ceramic monolithic construction. Conventional flow-through catalyzing substrates are usually effective in furthering the combustion of exhaust gases (e.g., carbon monoxide to carbon dioxide); however, they are also relatively expensive and are not effective in combusting exhaust particulate. There are various commercially available wall-flow substrates for filtering particulate from exhaust gases. Such filter substrates include porous ceramic monoliths like that disclosed, for example, in U.S. Pat. No. 4,276,071. Such extruded substrates have been made from porous materials such as cordierite or silicon carbide. These extruded ceramic filters can be durable and effective, but they are also relatively expensive. Less expensive ceramic fiber-based particulate filters have also been made for this purpose but, to date, such filters have not exhibited the characteristics (e.g., durability and effectiveness) needed to achieve commercial success. See, for example, U.S. Pat. Nos. 3,112,184, 3,899,555, 4,608, 361, 4,652,286, 4,718,926, 5,194,078 and 5,322,537. It is believed that the failure of such prior ceramic fiber-based filters to achieve commercial success has been due to a lack of durability in their intended working environment.

SUMMARY OF THE INVENTION

Therefore, there is a need for relatively inexpensive and durable fiber-based substrates for exhaust systems that can be used as wall-flow substrates, flow-through substrates or both. The present invention satisfies this need.

In one aspect of the present invention, a method is provided for rigidifying a fiber-based paper suitable for use in an exhaust system of a combustion device (e.g., a diesel engine). In the method, a green ceramic fiber-based paper is impregnated with a first impregnating dispersion. The impregnated paper is then dried, calcined and fired to form a rigidified paper. This rigidification process is performed at least once and, preferably, two or more times. The green ceramic fiber-based paper comprises refractory ceramic fibers and an organic material. The organic material includes one or more organic binders and, optionally, it can be desirable to include organic fibers. The organic material, at least in part, provides the green paper with the strength and flexibility it needs to be handled and formed into a green substrate. The green paper being processed according to this method can be in the form of a green substrate designed so as to be useful, for example, as at least one of a wall-flow or flow-through substrate.

The first impregnating dispersion comprises an inorganic binder material and a penetrating agent. The inorganic binder material comprises a ceramic component. The ceramic component comprises a ceramic precursor material, a ceramic material or a combination thereof. The penetrating agent comprises an organic molecule or polymer. The penetrating agent sufficiently reduces the interfacial energy between the impregnating dispersion and the surfaces of the green substrate (i.e., the surfaces formed by the fibers and binder materials) to allow the impregnating dispersion to wet and be absorbed into the green paper, without significant flocculation or particle separation (e.g., phase separation) of the ceramic component in the impregnating dispersion. After the impregnated paper is dried and the dried paper calcined, the calcined paper is fired so as to at least partially burn the organic material and cause at least part of the ceramic component of the impregnating dispersion to bond together and to the refractory ceramic fibers of the paper. The bonding together of the ceramic component and the bonding of the ceramic component to the refractory ceramic fibers causes the fibers to be bound together and form a rigidified paper suitable for use in an exhaust system of a combustion device. When the paper is in the form of the substrate, the resulting rigidified substrate is suitable for use in an exhaust system of a combustion device.

After the firing, the refractory ceramic fibers, preferably, have a discontinuous coating (e.g., agglomerates) of the fired ceramic component that bonds the refractory ceramic fibers together at spaced locations along and at intersections of the refractory ceramic fibers such that the ceramic fibers retain much of their original flexibility while in the paper. The degree to which such bound fiber intersections are present in the paper can be varied by controlling the rigidification process and will likely depend on the degree to which the refractory ceramic fibers need to retain their original flexibility per the requirements of the particular paper or paper substrate. Therefore, some degree of continuity of the fired ceramic component coating could be acceptable.

The organic material can be burned-off in two or more firing stages (i.e., two or more rigidification processes), rather than all at once during the initial firing (i.e., the first rigidification process). Though, it is preferred for the organic material to be substantially or completely burned off during the initial firing. As used herein, the term "substantially burned" refers to almost all of the organic material being burned or combusted. The drying, calcining and firing can all be performed by the same heat source (e.g., an oven, furnace, etc.). The drying, calcining and firing can also be accomplished using one heating cycle, as well as multiple heating cycles. It is desirable to perform each of these steps at different temperatures (e.g., the drying at a lower temperature, the calcining at a middle temperature and the firing at a higher temperature).

It is desirable for at least part, and preferably most or all, of the ceramic component of the impregnating dispersion to have a charge that is opposite to the charge of at least part, and preferably most or all, of the refractory ceramic fibers so that the oppositely charged ceramic component and refractory ceramic fibers are attracted to one another. Such a difference in charge can promote adsorption of the ceramic component (e.g., nano-clay particles) onto the refractory ceramic fibers. This attraction can be accomplished by adjusting the pH of the impregnating dispersion. The impregnating dispersion can further comprise strengthening particles that have a charge (e.g., surface charge) that is the same as the charge of the refractory ceramic fibers or the ceramic component. The charge of such strengthening particles can also be converted to another charge, as desired. It can also be desirable for the impregnating dispersion to comprise different types of impregnating particles and for the charge on one or more of the different types of impregnating particles to be converted so as to effect attraction between impregnating particles that would otherwise not be attractive to one another.

It can be desirable for a coagulating agent to be included in the green paper (e.g., by being included in the slurry used to make the green paper) when the organic material comprises an organic binder material such as, for example, a latex. The coagulating agent coagulates at least the organic binder materials and causes attachment of at least the organic binder material to at least the ceramic fibers and, preferably, to organic fibers that may be in the paper.

During the impregnating of the green or rigidified paper or paper substrate, it can be desirable for surfaces of the paper or paper substrate to be exposed (e.g., dipped, sprayed, etc.) to the impregnating dispersion at a rate that is at least as fast as the rate at which the impregnating dispersion wicks into and through the paper, in order to avoid or at least minimize the physical separation of the impregnating dispersion components during the impregnation. During impregnation, it can be preferable for the rate at which the surfaces of the paper or paper substrate are exposed to the impregnating dispersion to be higher than the rate of wicking of the impregnating dispersion into and through the paper.

A rigidified paper or paper substrate can be additionally rigidified by repeating, in general, the above described rigidification process. In such an additional rigidification process, the additional firing causes at least part, and preferably most or all, of the ceramic component of the additional impregnating dispersion to bond together and to the ceramic fibers of the paper. The additional firing can also cause unreacted ceramic components of the previous impregnating dispersion, if any, to bond together and to the ceramic fibers of the paper. Such reacting of the additional ceramic components, and of the previously unreacted ceramic components, can thereby cause the refractory ceramic fibers to be further bound together, and form an additionally rigidified paper or paper substrate. After the organic binder material in the paper, or paper substrate, is substantially burned-off, it can be desirable to use an impregnating dispersion that does not include a significant amount of a penetrating agent.

The method of the present invention can also comprise a paper making process for making the paper from a paper slurry. The paper slurry can comprise refractory ceramic fibers and organic binder material. It can be desirable for the slurry to also contain particles of metal carbides (e.g., silicon carbide), an optional ceramic precursor in particle form, and a coagulating agent. The particles of metal carbides are in sufficient quantity to make the paper microwave receptive after the drying, calcining and firing. The optional ceramic precursor particles will form a high temperature ceramic after being fired, the coagulating agent will cause the organic binder material to coagulate onto the ceramic fibers, metal carbide particles and ceramic precursors in the slurry, and the organic binder material will impart flexibility and handling strength to the paper. It can be desirable for the paper slurry to further comprise an inorganic binder material comprising a ceramic component such as, for example, one or more colloidal clays. It may also be desirable for the ceramic component used in the paper slurry to also comprise metal oxides, metal oxide precursors and colloids of the same.

In another aspect of the present invention, a green ceramic fiber-based paper or paper substrate, or other three dimensional, polymer reinforced, green, ceramic fiber body, is provided that is suitable for use in an exhaust system of a combustion device (e.g., a diesel engine), after being rigidified. The green paper substrate or body comprises two or more sheets of green ceramic fiber-based paper formed into the green substrate, at least one sheet having a flat surface and at least another sheet being a creased sheet having a plurality of creases with each crease having an apex. The one sheet can be a flat sheet or another creased sheet. Each sheet of green paper comprises refractory ceramic fibers, an organic material that includes at least one organic binder and optional organic fibers. It can be desirable for one or more or each sheet of green paper used to make the green substrate to also include metal carbide particles (e.g., silicon carbide) in sufficient quantity to make the paper, after drying, calcining and firing, microwave receptive. An inorganic adhesive is disposed so as to bond the apex of each crease of the creased sheet to the flat surface or crease of the one sheet so as to laminate the two sheets together and form a plurality of tubular channels. The inorganic adhesive can comprise a high viscosity, high solids suspension of inorganic adhesive components, with optional organic adhesive components. Such inorganic adhesive components can include refractory ceramic particles (e.g., alumina, cordierite, mullite, alumino-silicate, etc.), ceramic precursors (e.g., nano-clays, boehmite, basic metal salts, metal hydroxides, metal oxyhydroxides, etc.) and combinations thereof.

Preferably, the ceramic fiber paper forming the green substrate or body is impregnated with an impregnating dispersion that comprises at least an inorganic binder material and, if the paper forming the substrate contains a high enough concentration of organic binder material, a penetrating agent. The inorganic binder material comprises a ceramic component. The impregnating dispersion in the green substrate is at least partially dried. The ceramic component is at least one of a ceramic material and a ceramic precursor. The ceramic component of the impregnating dispersion, preferably, comprises at least one or more colloidal nano-clays and, optionally. silicon carbide. It may also be desirable for the ceramic component to further include one or more of boehmite, colloidal zirconia and colloidal silica The ceramic component is in an amount so as not to unacceptably lower the permeability of the substrate and the homogeneity of the substrate after drying, calcining and firing. It can be desirable for the ceramic component to comprise at least one nano-clay material having a charge (e.g., a negative nature) that promotes adsorption of the nano-clay onto the ceramic fibers, when the ceramic fibers have an opposite charge (e.g., when the ceramic fibers are cationic and the nano-clays are anionic). It can be also desirable for the ceramic component of the impregnating dispersion to comprise ceramic particulate (e.g., ceramic particles, ceramic precursor particles, etc.) having an average particle diameter of less than about 4 micrometers, with at least about 80% by weight of the ceramic particulate having an average particle diameter of less than about 10 micrometers and at least about 95% by weight of the ceramic particulate having an average particle diameter of less than about 20 micrometers. It can also be desirable for the ceramic particles to have an average particle diameter of up to about 5 micrometers. It may also be desirable for the ceramic particles to have an average particle diameter of up to about 6 micrometers.

The penetrating agent comprises an organic molecule or polymer that sufficiently reduces interfacial energy between the impregnating dispersion and the surfaces of the green substrate (i.e., at least the surfaces formed by the fibers and binders) to allow the impregnating dispersion to wet and be absorbed into the green paper without significant flocculation or particle separation (e.g., phase separation) of the ceramic components in the impregnating dispersion (i.e., with substantial homogeneity of the ceramic components in the absorbed impregnating dispersion). The penetrating agent is sufficiently soluble in the impregnating dispersion so as to be present in an amount that enables it to be effective as a penetrating agent during impregnation. It is desirable for the penetrating agent to comprise an organic molecule or polymer that enhances wetting of the green substrate by the impregnating dispersion by at least one of (1) reducing the surface tension of the impregnating dispersion and (2) reducing the surface energy at the interface between the impregnating dispersion and the paper of the green substrate.

In a further aspect of the present invention, a rigidified ceramic fiber-based paper or paper substrate is provided that is suitable for use in an exhaust system of a combustion device (e.g., a diesel engine). The rigidified substrate comprises a ceramic fiber-based paper comprising refractory ceramic fibers and agglomerates of ceramic particles. The ceramic particle agglomerates are bonded to and disposed so as to thereby bond together the refractory ceramic fibers at spaced locations along and at intersections of the refractory ceramic fibers so that the refractory ceramic fibers retain much of their original flexibility while in the paper. The ceramic particles can comprise particles derived from colloidal nano-clays, silicon carbide, boehmite, colloidal zirconia, colloidal silica, alpha-alumina, transition aluminas, ceria, ceria zirconia mixtures, aluminum titanate, cordierite, mullite, other aluminosilicates and combinations thereof. This rigidified paper substrate can be used in combination with a mounting material or mat and a housing. The substrate is disposed in the housing and the mounting material is positioned between the substrate and the housing so as to form a substrate assembly. The rigidified paper substrate can be a filter element, a catalyst support or both. The rigidified paper substrate is, preferably, suitable for use in an internal combustion engine exhaust system.

The rigidified paper or paper substrate is, preferably, regenerable with microwave heating so as to promote the combustion of carbon trapped in the paper or paper substrate, residue carbon on exposed surfaces of the paper or paper substrate, or both. To effect this regenerability, at least in part, at least some of the ceramic fibers included in the substrate can be at least partially coated with or at least partially contain oxidation catalyst material(s). Such fibers are typically introduced during the paper making process. It is also desirable, in order to effect regenerability, for the ceramic particles to include metal carbide particles (e.g., silicon carbide) in sufficient quantity to make the rigidified paper microwave receptive. In one exemplary rigidified paper, or paper substrate, useful in filtering exhaust gases, the refractory ceramic fibers comprise aluminum containing ceramic fibers and the ceramic particles comprise silicon carbide particles. This exemplary paper, or paper substrate, can also, desirably, further comprise oxide material comprising silicon.

It can be desirable for the ceramic particles in the rigidified paper to have an average particle diameter of less than about 4 micrometers, with at least about 80% by weight of the ceramic particles having a particle diameter of less than about 10 micrometers and at least about 95% by weight of the ceramic particles having a particle diameter of less than about 20 micrometers. It can also be desirable for the ceramic particles to have an average particle diameter of up to about 5 micrometers. It may also be desirable for the ceramic particles to have an average particle diameter of up to about 6 micrometers.

Preferably, the refractory ceramic fibers in the rigidified paper, or paper substrate, are somewhat oriented (i.e., not completely random in their orientation). It can also be preferred that greater than about 60% of the refractory ceramic fibers in the rigidified paper are aligned within about 35° of being parallel with the plane of the paper. It is further preferred that lenticular or plate-like pores be formed or otherwise present inside the paper, with the pores being aligned close to parallel with the plane of the paper. Such lenticular or plate-like pores have long axes typically in the range of from about 50 to about 300 micrometers in length and in the range of from about 10 to about 50 micrometers in height. It can be preferable for the ceramic particles to not form a contiguous phase (i.e., the particles typically form a discontiguous phase) throughout the rigidified paper substrate. Typically, the ceramic particles also do not form a continuous coating (i.e., the particles typically form a discontinuous coating) on the ceramic fibers within the rigidified paper.

The rigidified paper substrate can be a wall-flow substrate or a flow-through substrate. The rigidified paper and the rigidified paper substrate can exhibit above 70% porosity and even in the range of about 80% to 95% porosity. The rigidified paper, or paper substrate, preferably exhibits a porosity in the range of from about 80% to about 95%, with a mean flow pore diameter in the range of from about 10 to about 15 micrometers as measured by porosymmetry. It can be desirable for the rigidified paper, or paper substrate, to have a low glass content (typically glass particles) of less than 5% by weight, more desirably, less than 2% by weight and, even more desirably, less than 1% by weight. It can also be desirable for the rigidified paper substrate to have a low alkaline metal content of less than 2% by weight and, more desirably, less than 0.5% by weight.

As used herein, the term "green" refers to an article or composite comprising organic material and inorganic fibers that has not been calcined or fired, i.e., exposed to sufficient temperatures to burn away a substantial amount or all of the organic material. Examples of such an article or composite include the ceramic fiber-based paper substrate of the present invention and the paper used to make the substrate.

As used herein, the term "glass" refers to metal oxide or metal sulfide based materials, usually having high alkaline metal oxide contents, that react with neighboring ceramic materials in the fiber-based substrate to cause exaggerated grain growth and embrittlement of those neighboring ceramic materials or that melt during the calcining or firing steps in the present rigidification process or during the use of the fiber-based substrate in an exhaust system. Such glass materials can include, for example, glasses that fall within the following broad groups: sodium and potassium alumino-silicates, alkaline metal boro-silicates, alkaline metal alumino-boro-silicates, etc. Note that some of the glasses that fall within these broad groups may not be a glass, as that term is defined above.

As used herein, the term "ceramic" refers to ceramic materials other than a glass.

As used herein, the term "nano-clay" refers to a clay in the form of extremely fine platelets, flakes or other particles where at least one dimension of the particle is in the nano-range. It is desirable to use nano-clay particles that have at least one dimension of less than about 30 nanometers and, preferably, less than about 20 nanometers. Preferably, the primary dimension of the nano-clay particle, i.e., the largest dimension, is less than about 50 nanometers. It is preferable for the nano-clay particles to be in the form of platelets or flakes.

As used herein, a ceramic dispersion or sol refers to a liquid medium in which ceramic particles (e.g., powders, flakes) have been added and uniformly dispersed within the liquid medium.

As used herein, a primary dispersion refers to a dispersion comprising a solution containing a ceramic component and at least one penetrating agent. The primary dispersion is used in at least the first impregnating solution to impregnate a polymer reinforced green ceramic paper or paper body.

As used herein, aspect ratio refers to the ratio of the length of an item to the width of an item. In this regard, a fiber having a length of 100 micrometers and a width of 2 micrometers would be described as having an aspect ratio of 50.

As used herein, a wall-flow fiber-based paper substrate is one where the exhaust gases have to flow through the substrate walls in order to pass through the substrate (e.g., a particulate filter).

As used herein, a flow-through fiber-based paper substrate is one where the exhaust gases make contact with the external surfaces of the substrate walls but do not have to flow through the walls in order to pass through the substrate (e.g., a catalyzing support).

As used herein, the term porosity refers to connected porosity as opposed to closed-cell porosity. Connected porosity in the paper is desirable because it allows gases to penetrate through the paper, while closed-cell porosity would not.

DETAILED DESCRIPTION OF EMBODIMENTS OF THE INVENTION

Figure 1:
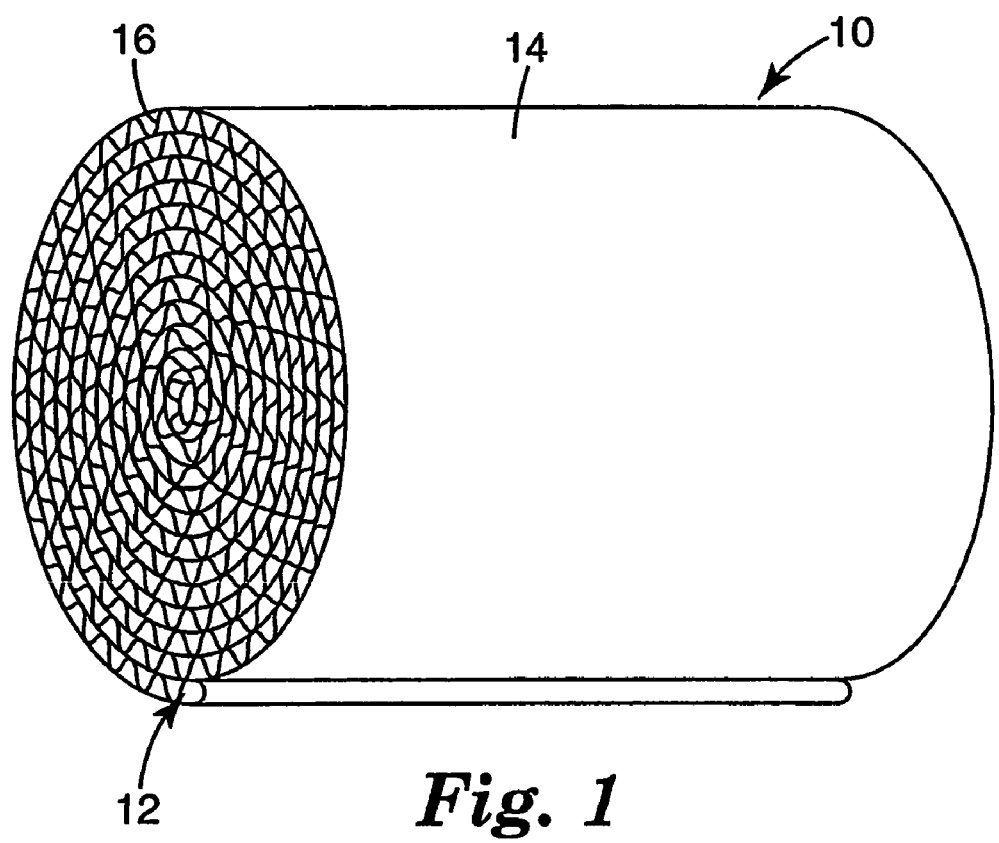
FIG. 1 is a perspective view of a fiber-based paper substrate according to the present invention.

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto and the equivalents thereof.

The present invention provides a high strength and durable refractory ceramic fiber-based paper substrate that can be used for wall-flow (e.g., filtering) and/or flow-through (e.g., catalyzing) applications. The fiber-based paper substrates of the invention are typically characterized by one or more of the following characteristics: low density, high strength, low back pressure (i.e., high percentage of porosity), high trapping efficiency, high thermal stability, and high chemical stability. For filtering applications, the present fiber-based paper substrate can exhibit above 70% porosity and up to in the range of about 80% to 95% porosity. Preferably, the present fiber-based paper substrates have a low glass content (typically glass particles), for example, of less than about 5 weight percent and preferably less than about 2 weight percent and most preferably less than about 1 weight percent. It is desirable for the present fiber-based paper substrate to have a low alkaline metal content of, for example, less than about 2% by weight, preferably less than about 0.5 weight %, and more preferably less than about 0.25 weight %. The low glass content and the low alkaline metal content impart better chemical stability and thermal stability to the fiber-based paper substrates. Thermal cycling of glass in the contact with ceramic fibers causes the glass to attack the ceramic fibers, resulting in a loss of strength of the ceramic fibers. In addition to being useful as a filter element and/or a catalyst support, the present invention can also be compatible with regeneration technologies such as, for example, microwave or direct heating, which are used to promote the combustion of carbon trapped in the substrate (e.g., filtered soot particles) or residue carbon on exposed surfaces of the substrate.

In general, one embodiment of the method of making a fiber-based paper substrate, according to the present invention, includes rigidifying an organic binder-containing "green" ceramic fiber-based paper substrate by impregnating the green substrate at least once, with an impregnating dispersion or sol, and then drying, calcining and firing the impregnated substrate. The drying, calcining and firing steps can be accomplished using one heating cycle or multiple heating cycles. The resulting rigidified fiber-based paper substrate can be further strengthened, if desired, by repeating the above procedure with the once-rigidified substrate as many time as necessary to achieve the strength desired.

The green ceramic fiber paper-based substrate is formed from ceramic fiber paper. This paper can be made using conventional paper making processes and equipment. In a typical process, an aqueous or solvent dispersion of ceramic fibers and other components is prepared in a solution mixer or blender. The other components include inorganic and/or organic binders, and optional materials including organic fibers, surfactants, clays, defoamers, and other particulate materials. While fiber breakage normally occurs during the mixing, it is desired to avoid excessive fiber breakage to obtain papers with higher tear strengths. In this respect it is preferred that the aspect ratio of the fibers in the paper be about 50 or greater and preferably about 100 or greater. The extent of fiber breakage, and hence, the average aspect ratio of the fibers, can vary with the time and energy of mixing, with the properties of the fibers (friability and strength), the nature of the mixing (blade conformation, size, speed) and the viscosity of the pulp mixture. The exact parameters are determined experimentally, and this process is well known to those skilled in the art of paper making.

In one experimental practice, the pulp slurry is sheared with a blender such as a Waring blender (Dynamics Corporation of America, New Hartford, Conn.) for 30 to 90 seconds to produce a uniform mixture of the ceramic and organic fibers in the slurry prior to paper making. Organic fibers and binders, such as a latex binder, are preferably included to impart flexibility and handling strength to the sheet. A coagulating agent is added to the slurry to coagulate organic and/or inorganic binders and cause attachment of the organic and/or inorganic binders to the ceramic and organic fibers. Immediately after coagulation, the slurry is wet laid onto a fine screen or felt. The water or solvent is removed e.g., by pressing or vacuuming, leaving a sheet of entangled fibers and binders. The pressed paper is then dried, e.g. in ovens between about 50-150° C., and the polymer reinforced green ceramic paper sheet is wound into rolls for further processing.

The weight of the polymer reinforced green ceramic paper sheet is, preferably, in the range of from about 125 grams per square meter ($g/m^2$) to about 175 $g/m^2$ and the thickness is in the range of from about 0.75 mm to about 1.1 mm. Preferably, the tensile strength of the paper is also about 1500 kPa or greater, and after firing, the porosity is typically above 70% porosity and can be up to in the range of from about 80% to about 95% with a mean flow pore diameter in the range of from about 10 to about 15 micrometers as measured by porosymmetry.

Preferably, the ceramic fibers for the present invention are made with refractory materials so that they remain virtually unchanged in performance after being heated to a temperature of 1200° C. for brief periods of time. It can be desirable for the ceramic fibers to be included in the slurry in an amount in the range of from about 50% to about 80% by weight, and preferably in the range of from about 70% to about 80% by weight, of the solids in the slurry. It can be desirable for the diameters of the ceramic fibers to be in the range of from about 1 micron to about 25 microns. Diameters in the range of from about 2 microns to about 8 microns are preferred. The length of the ceramic fibers can vary, but in general, a length to diameter ratio of greater than about 100 is preferred in order to produce papers with higher tear strengths. Ceramic fibers of different lengths and diameters, and compositions can be advantageously blended to also produce high strength, uniform papers.

Suitable ceramic fibers can be formed using refractory materials including, for example, metal oxides, metal nitrides, metal carbides or combinations thereof. It is desirable for the ceramic fibers to at least include, and preferably are mostly or completely, fibers formed from metal oxides which include alumina, alumina-silica, alumina-boria-silica, silica, zirconia, zirconia-silica, titania, titania-silica, rare earth oxides, and combinations thereof. It can also be desirable for at least some or all of the ceramic fibers included in the slurry to be at least partially coated with or at least partially contain oxidation catalyst materials. In addition, it can be desirable to at least partially coat the ceramic fibers with such a catalyst material after the fibers are put in paper form. The ceramic fibers in the paper can also comprise catalyst material(s). Such catalyst materials can include, for example, ceria; ceria-zirconia; first transition series oxides; perovskites, such as titanates and rare earth cobalt or manganese oxides; and other materials known to be active oxidation catalysts for the oxidation of diesel soot.

Organic materials such as, for example, organic fibers are, preferably, included in the slurry used to make the ceramic paper. Suitable organic fibers can include, for example, those formed from acrylic, rayon, cellulose, polyester, nylon, Kevlar™, and combinations thereof. In a preferred embodiment, cellulose fibers and/or fibrillated synthetic organic fibers are included in a combined total amount in the range of from about 10% to about 15% by weight of the solids in the slurry. Cellulose fibers include, for example, long-length northern softwood fibers or synthetic cellulose fibers. Fibrillated organic fibers include, for example, fibrillated Kevlar™ fibers (E. I. du Pont de Nemours and Company, Wilmington, Del.) and fibrillated polyolefin fibers such as Fybrel (Mitsui Chemicals America, Incorporated, Purchase, N.Y.). Cellulose fibers are capable of hydrogen bonding and the addition of these fibers can improve the wet web strength of the green paper as it is formed on the paper making machine. The fibrillated fibers, preferably having a diameter similar to the ceramic fibers, provide added mechanical integrity to the paper. The fibrillated fibers typically have a kinked structure. It is believed that the kinked structure of the fibrillated fibers causes the fibrillated fibers to become mechanically entangled with the ceramic fibers, thereby significantly increasing the resistance of the paper to cutting or tearing. The additional structural integrity resulting from the use of fibrillated fibers is believed to enable the paper to be folded or pleated while maintaining the integrity of the fiber paper. Additionally, the high temperature resistance of Kevlar™ can allow the paper to maintain its integrity at higher temperatures, which can allow the curing of additional inorganic binders.

The green ceramic paper may include an organic binder to impart flexibility and handling strength to the green paper. The organic binder can be a latex, thermoplastic fibers or a combination thereof. Though, latex binder materials are preferred. Preferably, a thermoplastic latex binder is added to the ceramic fiber slurry in an amount in the range of from about 2% to about 10% by weight of the solids content of the slurry. Suitable organic binders include those composed of polymers that have a glass transition temperature above normal ambient temperature, e.g., about 20° C. The organic binder imparts a degree of thermoplastic character to the green ceramic fiber paper. Such thermoplasticity is desired for convenient forming (e.g., thermoforming) of pleats, creases and bends in the green paper without breakage, and to retain the shape of the formed articles after forming. Thermoplastic organic binder materials include acrylics, styrene-butadiene, butadiene, polyvinylchloride, acrylonitrile-butadiene and polyvinylacetate. Acrylic binder materials are preferred for their ability to burn without creating excessive noxious by-products. Suitable latex materials are commercially available from suppliers such as B.F. Goodrich of Cleveland, Ohio, under the HYCAR tradename.

The green paper may be impregnated with inorganic binder material such as, for example, ceramic precursors, ceramic particles (e.g., powders, fiber segments, flakes, etc.) or both, before being formed into a green ceramic fiber-based paper substrate. The inorganic binder material can be added into the paper by dipping the paper into a solution made with the inorganic binder material (e.g., an impregnating sol) and/or imbedding the inorganic binder material using ultrasonic impregnation. When the paper is dipped in such a solution, the paper is thereafter dried. This drying process can be partially or completely eliminated when ultrasonic impregnation is used in addition to or instead of the solution dipping process. Once the inorganic binder material is in the paper, it is believed that the ultrasonically impregnated paper may be further processed as if it were a dried, sol impregnated paper. It is also believed that a combination of solution dipping and ultrasonic impregnation can be used. Before and/or after the inorganic binder material is applied throughout the green paper, additional inorganic binder material can be applied to the green paper in a pattern, for reasons such as those discussed below. Alternatively, it may be desirable for the inorganic binder material to be applied to the green paper in a pattern, instead of being applied throughout the green paper.

It is believed that instead of, or in addition to, using an impregnation process, inorganic binder material such as, for example, ceramic precursors, ceramic particles (e.g., powders, fiber segments, flakes, etc.) or both, may be included in the paper slurry in order to provide additional strength to the ceramic paper and/or to alter the pore structure of the paper. Ceramic precursors are, generally, materials that will form a high temperature ceramic after being fired. Suitable ceramic precursors include, for example, metal oxy-hydroxides, low solubility metal salts and low solubility metal complexes that are low in alkali metal content. Suitable ceramic particles include powder of, for example, metal oxides, metal nitrides, metal borides and metal carbides. Representative examples of ceramic precursors that may be suitable include boehmite (aluminum oxy-hydroxide), hydrated clays, aluminum trihydrate, iron oxy-hydroxide, and oxalate complexes such as calcium oxalate, magnesium oxalate, copper oxalate and rare earth oxalate. Representative examples of ceramic particles that may be suitable include powders of aluminas, aluminosilicates, silicon carbide, silicon nitride, silica, titanium nitride, titanium boride, boron nitride, zirconia, ceria, iron oxide, magnesia, rare earth oxides and aluminates, barium aluminate, calcium aluminate, zirconium phosphate, and rare earth phosphates. Certain of these additives may be used to introduce catalytic activity or microwave receptivity to the resulting ceramic fiber-based paper substrate. For example, metal carbides (e.g., silicon carbide) can be used to introduce microwave receptivity. In addition, for example, a ceria-zirconia alloy and iron oxide can be used to introduce catalytic activity. Large amounts of these additives can lower the tensile strength and the flexibility of the green ceramic fiber paper, thereby making it difficult to high speed wind and pleat the green ceramic paper. In addition, in large amounts these additives can lower the filtering capability of the rigidified ceramic fiber-based paper substrate, by reducing the porosity and/or the average pore size of the ceramic paper. In general, it is believed that these ceramic precursors and ceramic particles can be added in amounts up to about 30%, and possibly up to about 40%, by weight of the ceramic solids in the paper slurry.

It can be desirable to add chemical agents to induce coagulation of the organic binder and cause attachment of the organic binder to the fibers and particles in the slurry. When a latex material is used as the organic binder, it is desirable to add chemical agents to induce coagulation of the latex binder and cause attachment of the latex material to the fibers and particles in the slurry. For example, with a latex binder, ammonium aluminum sulfate can be used as a coagulating chemical agent. The ammonium aluminum sulfate lowers the pH of the slurry and provides a polycationic metal complex that destabilizes anionic particle suspensions. Other coagulating chemical agents that can be useful include polyanionic complexes, anionic and cationic polymers, and other metal salts or complexes known to form polynuclear cationic species in solution.

The green ceramic paper can be formed into a green ceramic fiber-based paper substrate, or other three dimensional, polymer reinforced, green, ceramic fiber body, by conventional processes. Such processes can include, for example, pleating, corrugating, rolling, laminating, stacking, and combinations thereof. For examples of prior ceramic fiber-based filter substrates and methods of their manufacture see U.S. Pat. Nos. 3,112,184, 3,899,555, 4,608,361, 4,652,286, 4,718,926, 5,194,078 and 5,322,537. In one embodiment of the present invention, a sheet of polymer reinforced, green, ceramic fiber paper is pleated to form a creased paper sheet having parallel creases or folds uniformly spaced and running the width of the green ceramic paper. This creased paper sheet is laminated to a second, flat polymer reinforced, green, ceramic fiber paper sheet of similar width to form a channeled paper laminate that defines a multitude of uniformly spaced tubular channels or pathways. The tubular channels are formed by the intersection of alternating creases of the creased paper sheet with the flat paper sheet. The tubular channels extend the width of the channeled paper laminate. The tubular channels can be triangularly-shaped, simi-circular-shaped or any other shape desired. The preferred tubular channels have an equilateral, triangular cross-section with rounded corners. It is believed that such a shape allows for maximum bonding in the channeled paper laminate while maximizing the exposed surface area of the substrate (i.e., the inside surface area of the tubular channels).

At the time of lamination, an inorganic adhesive or mixed inorganic/organic adhesive can be applied at the apex or ridge of the creases or other areas of contact between the two ceramic paper sheets to increase the strength of the bond of the flat sheet to the creased sheet. A high viscosity, high solids suspension of ceramic particles (e.g., powders, fiber segments, flakes, etc.) can be suitable such as, for example, a suspension of alumina, silicon carbide, or the like particles. An organic adhesive component such as, for example, a latex, vinyl or starch based adhesive can be added to increase the tack and adhesive characteristics of the ceramic particle adhesive. After drying, calcining and firing of the fiber-based paper substrate, the inorganic components of the adhesive remain and act to bond the laminated sheets of paper together.

The channeled paper laminate is then formed into a three-dimensional article so as to provide the fiber-based paper substrate, or other polymer reinforced, green, ceramic fiber body. Channeled paper laminates can be layered or stacked to produce a structure having the tubular channels in the laminates extending in a parallel fashion. In the formation of the channeled paper laminates, an inorganic adhesive or mixed inorganic/organic adhesive can be applied at the apex or ridge of the channels of each channeled paper laminate or at other areas of contact between adjacent laminates to increase the strength of the bond between the laminates. The overall shape of such a construction can be any three dimensional shape desired (e.g., cubic, prismatoidal, cylindrical, etc.). Likewise, the cross-section of such a construction can be any desired shape (e.g., square, rectangular, oval, trapezoidal, circular, etc.). The shape and orientation of the paper laminates and sheets used to assemble the fiber-based paper substrate can be chosen to effect the desired shape.

Figure 3:
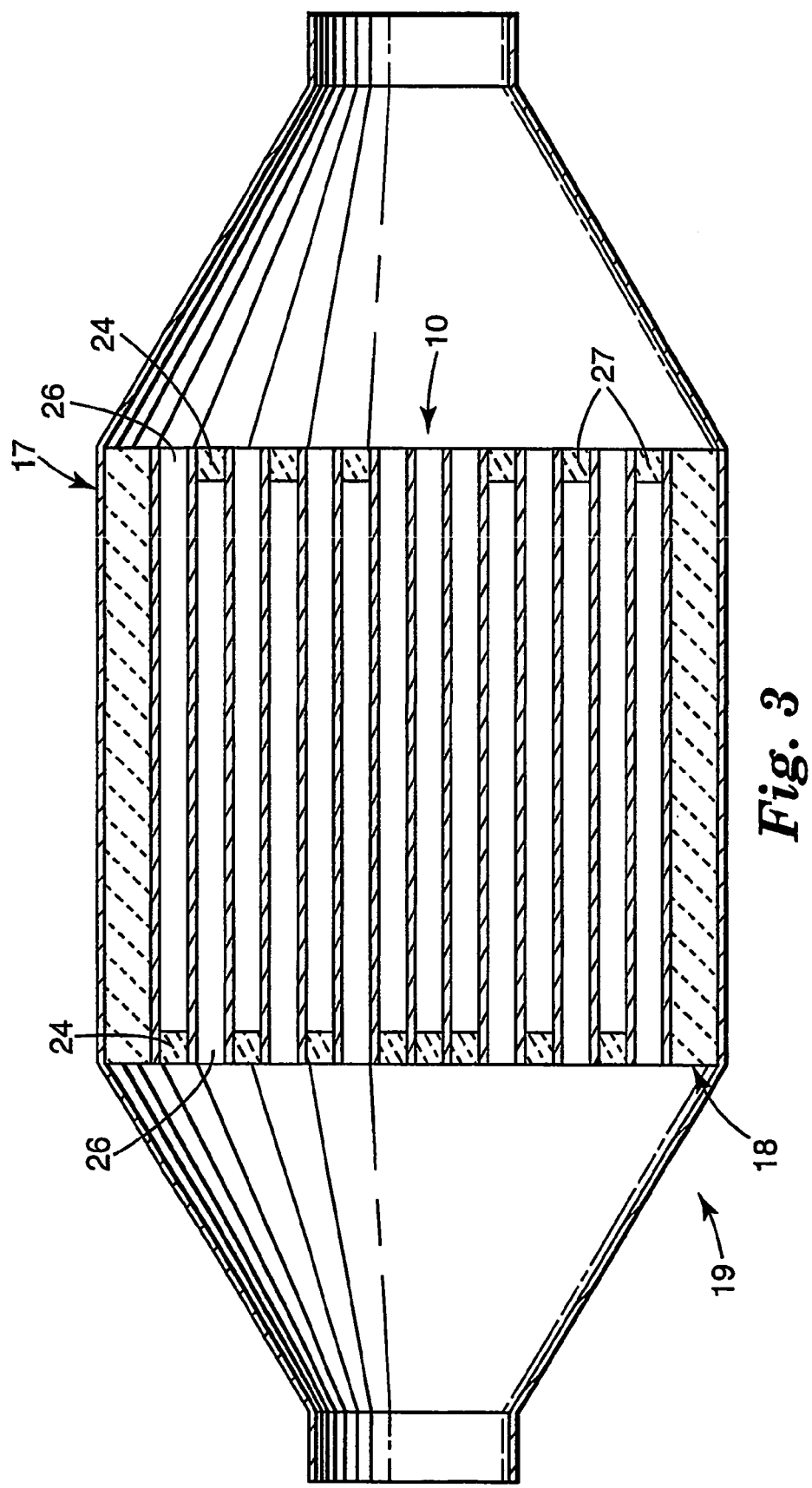
FIG. 3 is a schematic cross sectional view of a wall-flow fiber-based paper substrate assembly according to the present invention.
Figure 4:
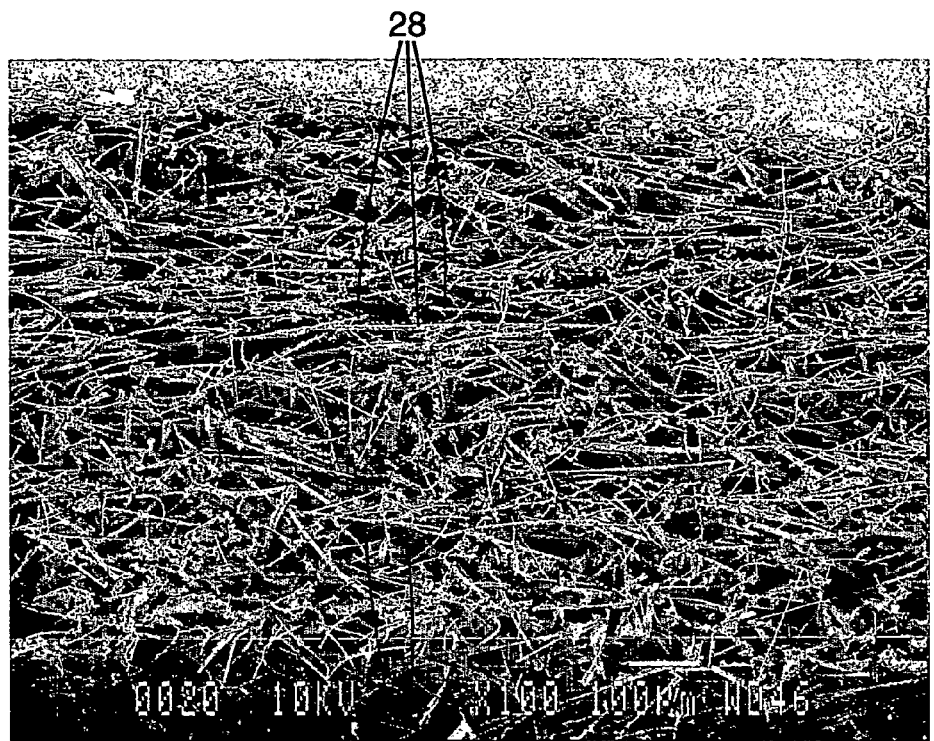
FIG. 4 is a 100× magnification photomicrograph of a cross-sectioned ceramic fiber paper that has been impregnated, dried, calcined and fired once according to the present invention.
Figure 5:
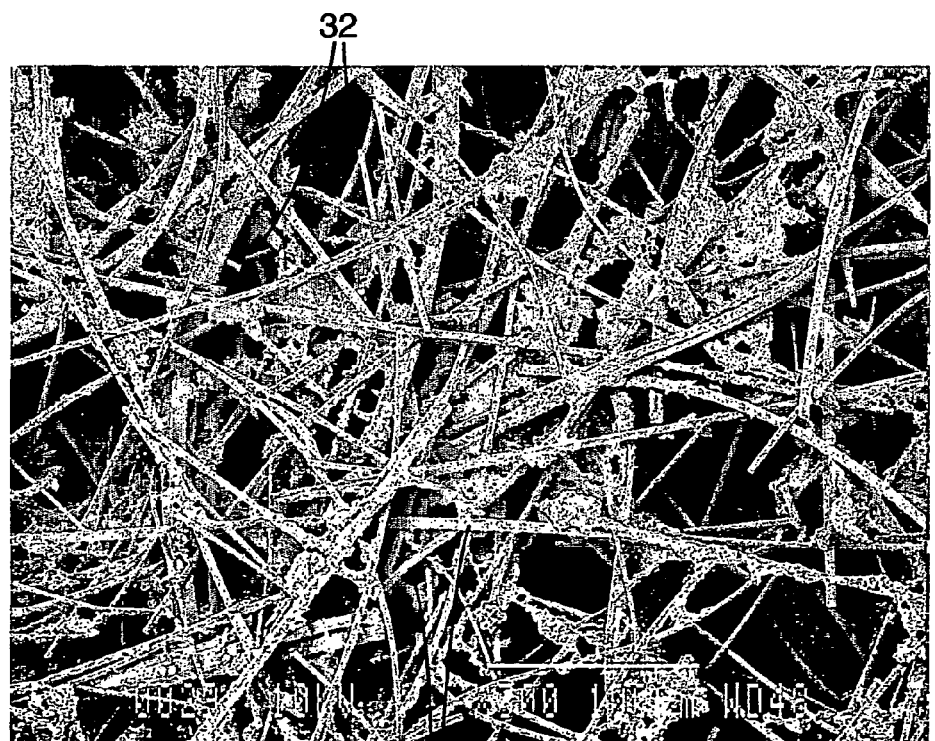
FIG. 5 is a 300× magnification photomicrograph of the surface of a ceramic fiber paper that has been impregnated, dried, calcined and fired once according to the present invention.
Figure 6:
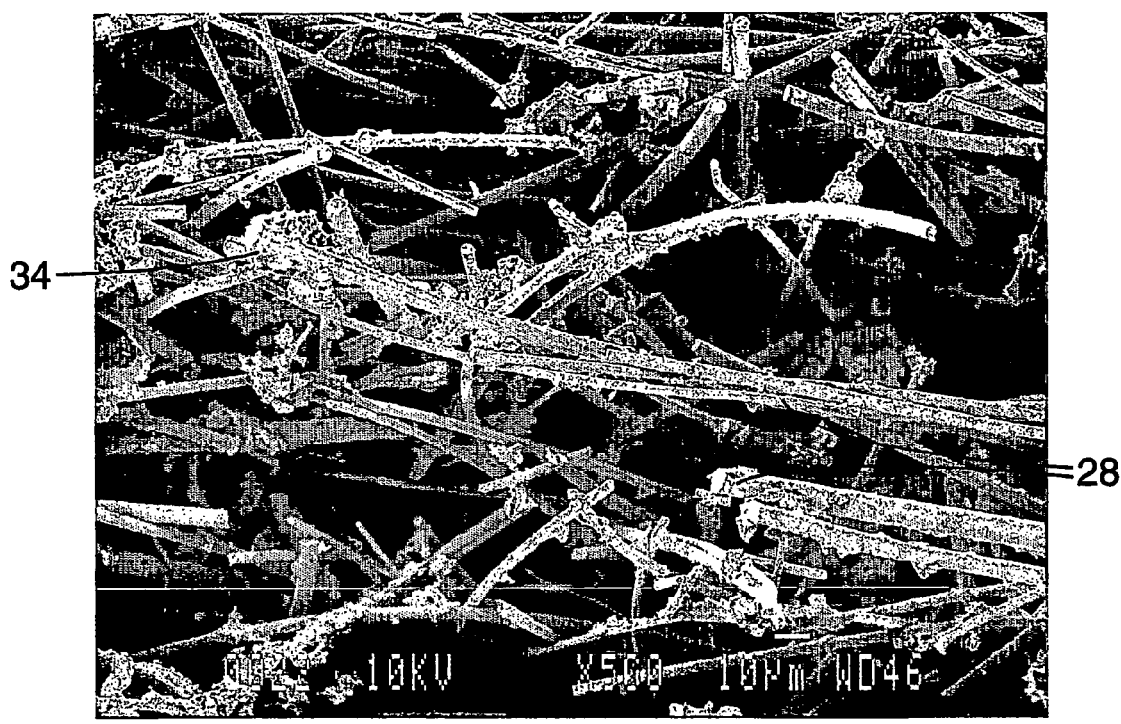
FIG. 6 is a 500× magnification photomicrograph of a cross-sectioned ceramic fiber paper that has been impregnated, dried, calcined and fired once according to the present invention.
Figure 7:
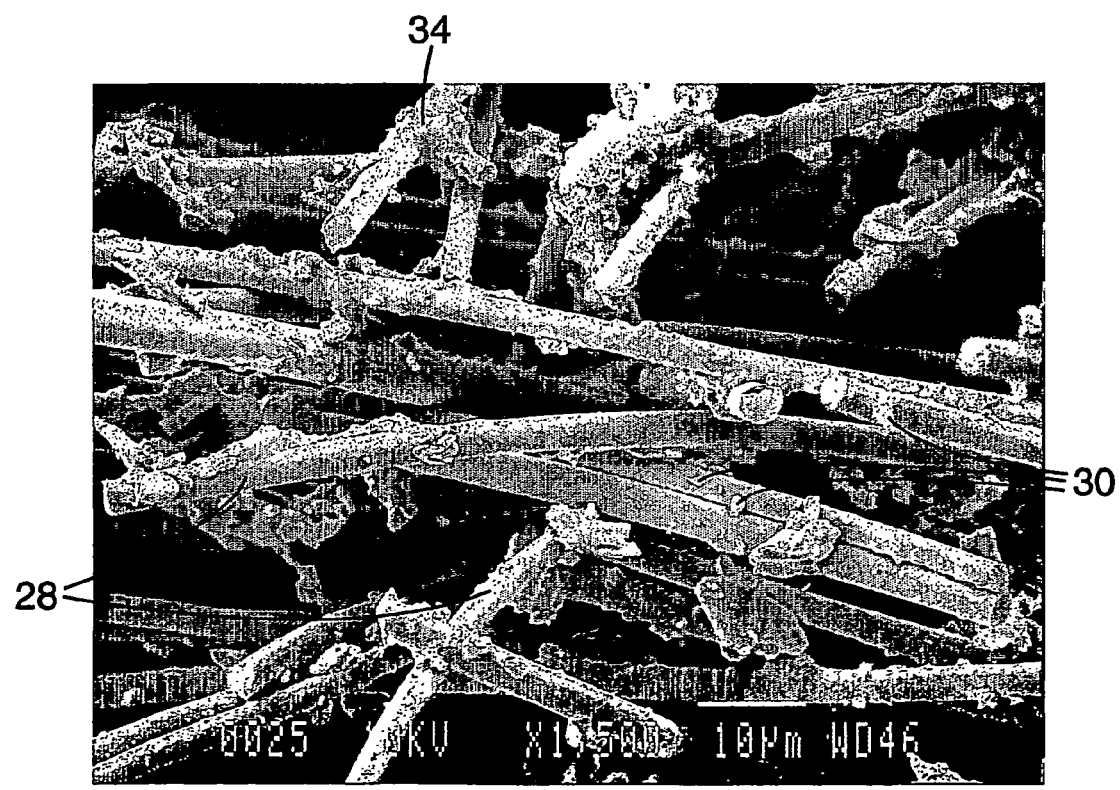
FIG. 7 is a 1,500× magnification photomicrograph of a cross-sectioned ceramic fiber paper that has been impregnated, dried, calcined and fired once according to the present invention.

Referring to FIGS. 1 and 3, a preferred construction for a fiber-based paper wall-flow (i.e., filter) or flow-through substrate 10 of the present invention is one in which a channeled paper laminate 12 is wound either upon itself or upon a mandrel to produce a cylindrical shape having a somewhat, or substantially, circular or ellipsoidal cross section and a length or longitudinal direction generally perpendicular to its cross section. The final green ceramic fiber body 10 is preferably a spirally wound element having alternating flat paper sheets 14 and creased paper sheets 16. Such a circular or ellipsoidal cylindrically shaped body 10, compared to more angular shapes (e.g., cubic, etc.), can be relatively easier to manufacture and mount in a conventional metal housing or sleeve 17, using a suitable mounting material or mat 18. Even so, the present invention is not intended to be so limited and may include more angular-shaped substrate bodies. The resulting filter 19, using substrate 10, can then be attached into an exhaust system of a combustion device such as, for example, an internal combustion engine (e.g., vehicle engines, power generators, etc.), power plant, incinerator, etc. During the winding of the green channeled paper laminate 12, contacting green paper surfaces would likely form some degree of bonding between adjacent windings of the laminate 12. Preferably, an inorganic or mixed organic/inorganic adhesive is applied to the flat side of the laminate 12, to the creased side of the laminate 12, or to both sides, in order to strengthen the bond, or form a bond, between adjacent wraps of the laminate 12, during and after winding.

It is preferable that any adhesive used in the construction of the fiber-based paper substrate 10, or other polymer reinforced, green, ceramic fiber body, have an inorganic component that continues to act as an adhesive between adjacent surfaces of ceramic fiber paper, after removal of the organic component by calcining and firing. The inorganic component is preferably a high viscosity, high solids suspension of colloidal alumina or other refractory ceramic material. The adhesive can also include an organic adhesive component such as a latex, vinyl or starch polymer. The organic adhesive component can be advantageously used to increase the surface tack and adhesion of adjacent surfaces of ceramic fiber paper in the channeled paper laminate 12 and in the final construction of the ceramic fiber body 10.

Figure 2:
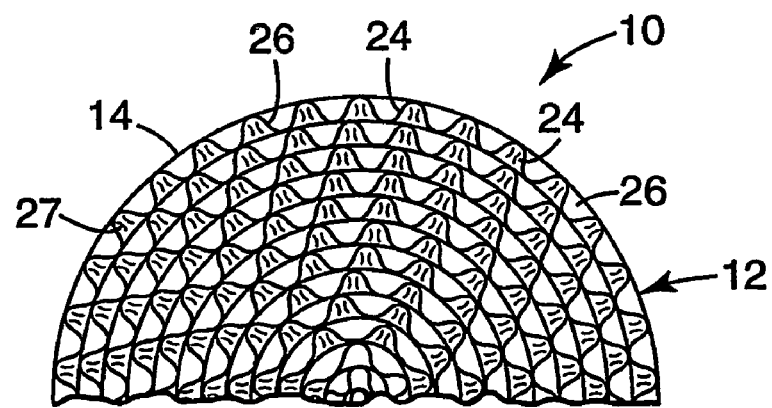
FIG. 2 is a partial end view of a wall-flow fiber-based paper substrate according to the present invention.

Referring to FIGS. 2 and 3, in one embodiment of a wall-flow fiber-based paper substrate 10, according to the present invention, alternating ends 24 of adjacent tubular channels 26 in the wall-flow substrate 10 are each enclosed with a plug 27 to force exhaust gases to flow though the paper walls during, for example, a filtration operation. Thus, each channel 26 has an open end and a plugged end 24. The ends 24 of these channels 26 can be most easily plugged prior to or during the winding of the channeled paper laminate 12 to form the green substrate 10. Plugging can be accomplished by extruding, or otherwise applying, a plug precursor material into the channels 26 along one edge of the green laminate 12 and coating, or otherwise applying, the plug precursor material along the opposite edge of the green laminate 12 so as to fill the open crease in an area adjacent to the opposite edge of the laminate 12. The depth or width of the applied plug precursor material (i.e., the depth of the plug) must be sufficient to enable the resulting plug 27 to withstand the back pressure developed as exhaust gases flow through the paper walls of the final substrate 10. The minimum acceptable depth of the plug 27 will vary depending on such factors, for example, as the strength of the chosen plug material and the back pressure that builds-up during the particular application. In general, it can be desirable for the depth of the plug 27 to be about 0.5 cm or more and less than about 3 cm.

Suitable plug precursor materials can comprise a ceramic material and an organic polymer. In a preferred embodiment, the plug precursor composition can comprise a ceramic material, a ceramic precursor material, and an organic polymer. The organic polymer aids adhesion of the plug precursor material to the green ceramic paper and increases the strength of the green plug so that green plug can be processed with the green fiber-based paper substrate. Useful organic polymers can include organic latex materials, organic polymer solutions, solid organic particles, organic fibers and polymerizable organic molecules, or a combinations thereof. The ceramic materials and ceramic precursor materials can be in any suitable form including, for example, particles (e.g., powders, fiber segments, flakes, etc.), salts, salt solutions, colloids, and combinations thereof. Suitable ceramic materials can include metal oxides, metal carbides, metal nitrides, metal phosphates and metal oxy-nitrides. Suitable ceramic precursor materials can include metal hydroxides, metal oxy-hydroxides, metal salts, metal complexes, metal salt solutions and metal complex solutions. Oxide materials active as catalysts for the oxidation of the diesel soot such as cerium oxide and ceramic materials comprising transition metals may also be included in the plug composition. Ceramic fibers can be included in the plug material to provide reinforcement for the plug. It is desirable for the plug material to be chosen so as to exhibit a shrinkage during thermal processing (e.g., firing) that matches or approximates the shrinkage of the ceramic fiber paper, impregnated with the inorganic binder material, that occurs during thermal processing. In this way, the plug material can maintain a tight seal with the adjacent ceramic fiber paper walls during such processing and in final use.

Generally, it can be desired that the plug precursor material have a high ceramic content, e.g. greater than about 20% by weight total ceramic solids in the plug precursor material. It can also be desirable for the plug precursor material, as applied, to have a viscosity low enough to allow easy application (e.g., extrusion and coating) of the green plug precursor material to the green channeled paper laminate, but high enough to avoid excessive dripping or sagging of the plug material after it has been applied to the laminate. Plug precursor materials that exhibit shear-thinning viscosity behavior can be desirable. For example, such a shear-thinning viscosity behavior can be obtained by including a thixotropic dispersion in the plug precursor material. Other techniques for obtaining this type of behavior may also be found in the liquid paint art.

It can be desirable for an inorganic binder material to be used in the form of a pattern 42 that adds reinforcement and strength to the green, ceramic particle enriched paper 44. This inorganic binder material may include any of the ceramic materials that are disclosed herein as being suitable for impregnating the paper and, if deemed desirable, may also include a penetrating agent. Preferably the pattern is continuous or at least semi-continuous. The reinforcing pattern 42 can be formed over all of the surface area of the paper 44, over one or more selected areas or both (i.e., a higher concentration of patterning in one or more selected areas). Such selected areas may include, for example, all or part of the areas where the pleated paper contacts the flat sheet paper. It has been found that sections of the ceramic fiber-based paper substrate may telescope and extend longitudinally out from the remainder of the substrate (i.e., push-out), if the bond between the paper layers of the substrate are too weak to withstand the pressures exerted by, for example, the engine exhaust. Therefore, a reinforcing pattern 42 can be applied, for example, only to those areas between the paper layers that are prone to telescoping or push-out.

Figure 11A:
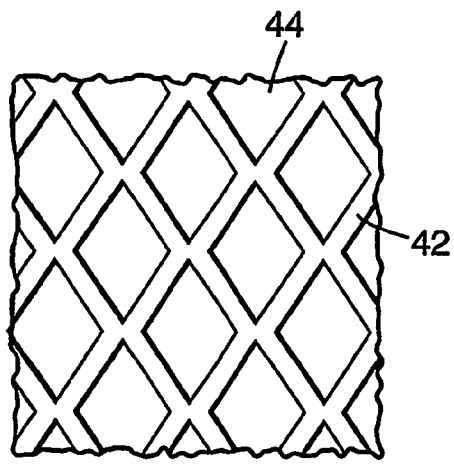
FIG. 11a is a planar view of a ceramic fiber paper that has been impregnated with reinforcing pattern.
Figure 11B:
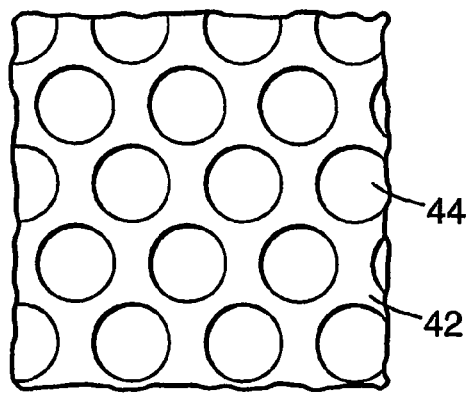
FIG. 11b is a planer view of a ceramic fiber paper that has been impregnated with an alternative reinforcing pattern.
Figure 11C:
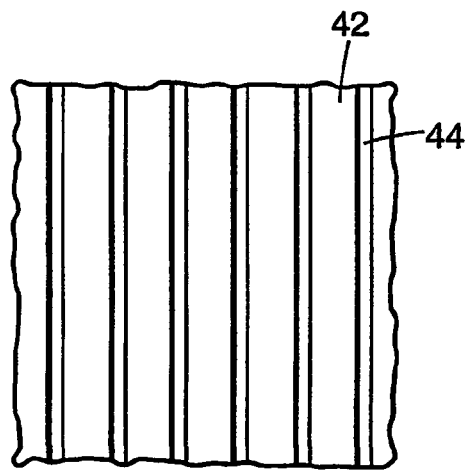
FIG. 11c is a planer view of a ceramic fiber paper that has been impregnated with another alternative reinforcing pattern.

The reinforcing pattern 42 can be (i) a cross-hatch, with square, rectangular, diamond-shaped (see FIG. 11*a*), or circular openings (see FIG. 11*b*), (ii) spaced-apart horizontal, vertical or diagonal lines (see FIG. 11*c*), or (iii) any other desired pattern. Preferably, the lines of FIG. 11*c* are connected together, for example, at adjacent ends, to form a continuous line. When the paper is to be used for filtering purposes, it is believed that the use of such a pattern can result in a stronger and more durable paper while maintaining a sufficient area of paper having a high degree of porosity, in the areas of the paper located within the cross-hatching, for filtering purposes. For filtering or non-filtering applications, it is believed that using such a pattern can also minimize the amount of inorganic binder material needed to produce a paper of sufficient strength and durability. The pattern can be applied by using any suitable process. It is believed that printing operations like screen, lithographic or flexographic printing or gravure coating can be used. After it is applied, the pattern is preferably dried and heated to a temperature sufficient to set the inorganic binder material but not to a temperature that would cause the organic binder in the green paper to fully or substantially decompose. The pattern may be dried in-line after the pattern is applied to the paper and before the paper is wound into a roll. It is believed that the patterned green paper may become stiff upon the pattern being dried and heated. Therefore, it may be necessary to first pleat and roll sheets of the patterned green paper into a substrate before drying and heating the paper to set the inorganic binder material. By using a pattern of parallel lines running transversely across the green paper (i.e., running parallel to the pleats or perpendicular to the longitudinal axis of the sheet), it is believed that patterned paper sheets may be dried and heated to set the inorganic binder material before pleating and rolling the sheets into a substrate.

When pleated and flat sheets of the patterned green paper are bonded together, a certain percentage of the surface area of the bond between the sheets is formed from overlapping reinforcing patterns of the sheets. It is believed that the bond between such overlapping reinforcing patterns, or even between patterned and non-patterned areas, may be stronger than the bond between overlapping non-patterned areas of the paper sheets, because the fibers in the patterned areas are held or bonded together more tightly.

It may be desirable to make a pattern that includes or consists of, for example, microwave receptive materials (e.g., silicon carbide and magnetic materials such as barium ferrite, rare earth containing magnetic materials, and magnetite) and/or electrically conductive materials (e.g., silicon carbide, pure and alloyed metallic materials), with the resulting pattern being useful as a heating or regeneration element in the substrate.

It is preferable for the green fiber-based paper substrate to be impregnated with a an inorganic binder material comprising a ceramic component via an impregnating dispersion according to the present invention. In the absence of such a an inorganic binder material, calcining and firing of the green fiber-based paper substrate will produce a relatively weak and friable ceramic fiber-based paper substrate that is unusable in exhaust system applications. In addition, the strength of the substrate can be improved by introducing one or more inorganic binder materials such as, for example, colloidal clays, colloidal nano-clays, boehmite, colloidal zirconia and colloidal silica into the slurry in the paper making process. However, there are limitations to using this approach alone. Generally, high strength can be obtained using this technique but only after the introduction of large amounts of the inorganic binder materials into the green ceramic fiber paper. For wall-flow fiber-based paper substrates, such large amounts of the inorganic binder materials can unacceptably lower the permeability of the substrate walls (i.e., unacceptably increase the wall-flow substrate back pressure) and the homogeneity of the resulting ceramic fiber-based paper substrate.

The deficiencies of the prior art (e.g., low strength and low mechanical, chemical and thermal durability) can be overcome by the rigidification process of the present invention. One rigidification process according to the present invention involves impregnating the green fiber-based paper substrate with a primary dispersion containing a ceramic component and, preferably, at least one penetrating agent. The penetrating agent appears to be necessary when a green fiber-based paper substrate containing a substantial amount of organic binder material is to be impregnated. The ceramic component of the primary dispersion is a ceramic precursor material, a ceramic material or a mixture thereof. The penetrating agent comprises an organic molecule or polymer that sufficiently reduces the interfacial energy between the impregnating dispersion and the surfaces of the green fiber-based paper substrate (i.e., at least the surfaces formed by the fibers and organic binders) to allow the impregnating dispersion to wet and be absorbed into the paper forming the green substrate, without significant flocculation or particle separation (e.g., phase separation) of the ceramic components in the impregnating dispersion (i.e., with substantial homogeneity of the ceramic components in the absorbed impregnating dispersion). For example, when the penetrating agent is an anionic surfactant, it is believed that the penetrating agent at least adsorbs on the organic binder rendering the surface of the organic binder anionic and, thereby, reducing its interfacial energy with the impregnating dispersion.

In one rigidification process according to the present invention, the green fiber-based paper substrate is brought into intimate contact with the primary sol, preferably, by submerging the substrate into a quantity of the primary dispersion sufficient to soak all of the substrate. It may also be possible to spray, pour or otherwise bring the primary dispersion in contact so as to be absorbed into the green substrate. During this impregnation step, the present primary dispersion penetrates pores in the green fiber-based paper substrate, carrying its ceramic component into the polymer reinforced, green ceramic fiber body of the substrate. The resulting dispersion impregnated green substrate is then dried, calcined and fired to produce an initially rigidified substrate. After drying, calcining and firing, most or almost all of the impregnated ceramic component (i.e., up to about 90% or higher) remains in the pores and chemically bonds to the ceramic fibers so as to impart strength to this initially rigidified substrate. The steps of impregnating, drying, calcining and firing a substrate shall be referred to as a rigidification process.

The rigidification process can be repeated in order to sequentially deposit more and more of the ceramic component materials into the body of the fiber-based paper substrate. In this way, the fiber-based paper substrate can be strengthened to the degree needed for the particular substrate application (e.g., an exhaust filter or catalytic converter for a diesel engine exhaust system), or as otherwise desired. While a desired degree of rigidification of the inventive fiber-based paper substrate can be obtained with the impregnating dispersion containing glass and/or large inorganic binder particles, the present invention is able, and it is preferred, to accomplish the desired degree of rigidification without the use of glass or large inorganic binder particles.

Each rigidification process creates bonds between the ceramic fibers and between the layers of ceramic fiber paper to produce a more rigid and durable fiber-based paper substrate. It has been found that the use of a penetrating agent in the second impregnating dispersion used after the initial rigidification process can be unnecessary. After the initial firing, the organic binder in the green substrate is burned off, making it easier for the next dispersion to impregnate the substrate. In general, as the rigidification process is repeated, the fiber-based paper substrate becomes more rigid and less porous. The fiber-based paper substrate can attain relatively high strength and durability while retaining a relatively high degree of porosity by limiting the number of times the substrate is exposed to the rigidification process. At some point, additional exposures to the rigidification process will not have a significant beneficial effect, such as when the percent porosity of the substrate drops so low that the impregnating dispersion is no longer able to penetrate into the paper walls of the substrate. For the flow-through substrate, it can be desirable for the substrate to have a low or no percent porosity. Therefore, the impregnating dispersions used after the initial rigidification process may or may not include a penetrating agent, depending on the need for a dispersion with additional penetrating characteristics.

The impregnation of the fiber-based paper substrate with a dispersion is, preferably, carried out so as to homogeneously impregnate the entire fiber-based paper substrate. It has been found that physical separation of the impregnation dispersion components can occur during impregnation of the dispersion in the fiber-based paper substrate. This physical separation can be avoided or at least minimized by exposing (i.e., bringing into contact, e.g., by dipping, spraying, etc.) surfaces of the fiber-based paper substrate to the impregnating dispersion at least as fast as the rate at which the impregnating dispersion wicks into and through the body of the substrate. This is true whether the substrate surfaces were previously treated or are untreated. Preferably, in an effort to avoid or at least minimize such physical separation, the rate of exposure of the substrate surfaces to the impregnating dispersion is higher than the rate at which the impregnating dispersion wicks into and through the body of the substrate. It has been found that it can be desirable for the body of the fiber-based paper substrate to be immersed in the impregnating dispersion at a rate of greater than about 0.25 cm of immersion depth per second, while not trapping air. It has been found that at least at this rate, the exposure rate typically remains as fast or faster than the rate of wicking. It has also been found that the use of a penetrating agent in the impregnating dispersion can facilitate the homogeneous impregnation of the fiber-based paper substrate. In addition, it is desirable for the impregnation to be carried out so as to maximize the rate that the impregnating dispersion flows through the tubular channels into the fiber-based paper substrate, without trapping air. With this in mind, it is desirable to immerse wall-flow substrates with plugged ends so that the tubular channels are oriented to run parallel to the surface of the impregnating dispersion. Because it does not have plugged ends, it can be desirable to immerse flow-through substrates so that the tubular channels are oriented to run either perpendicular or parallel to the surface of the impregnating dispersion.

The impregnation process can be carried out at ambient pressure or the pressure can be lowered by exposure to a vacuum to accelerate penetration of the impregnating dispersion and to remove all entrained gases from the fiber-based paper substrate. The optional exposure to a vacuum can be done while the substrate is being submerged in, or otherwise exposed to, the impregnating dispersion or afterwards. The exposure of the fiber-based paper substrate to lowered pressure during or after the dispersion impregnation can provide a more uniform and rapid impregnation.

The penetrating agent is, preferably, selected from a group of organic molecules that enhance wetting of the organic binder-containing body of the green ceramic fiber-based paper substrate by the impregnating dispersion. The penetrating agent facilitates wetting of the organic binder-containing fiber-based paper substrate body by reducing the surface tension of the impregnating dispersion and by reducing the surface energy at the interface between the impregnating dispersion and the substrate body. The penetrating agent must be sufficiently soluble in the impregnating dispersion so as to be present in an amount that enables it to be effective as a penetrating agent during impregnation. The penetrating agent and the ceramic component must be compatible (i.e., must not cause significant flocculation or particle separation) in the impregnating dispersion. Examples of useful penetrating agents include alcohols, organic amines, and water-soluble polymers and macromolecules. Representative examples of alcohols that can be useful as penetrating agents in aqueous impregnating dispersions include alcohols such as isopropyl alcohol, ethyl alcohol, tert-butyl alcohol, butyl alcohol, propyl alcohol, sec-butyl alcohol and other alcohols having at least moderate solubility in water. Organic amines that are useful include nitrate and halide salts of quartenary organic amines having at least one organic moiety attached thereto wherein said moiety comprises a carbon chain greater than 2 carbons in length. Water-soluble polymers and macromolecules such as those possessing hydroxo groups, carboxylate groups, ethylene oxide or propylene oxide linkages, amido functionality, sulfanato groups, phosphate groups, ammine funtionality or water soluble cyclic groups such as pyrroles can also be useful as penetrating agents. The concentration of the penetrating agent depends on the nature of the impregnating dispersion and the chosen penetrating agent. In the case of surface active penetration agents such as those having a propensity to adsorb on the surface of organic binders to induce wetting, the concentration can be very low, e.g., less than about 1% by weight of the impregnating sol. For penetrating agents such as alcohols that increase the oleophillic nature of the impregnating sol, in general, the concentration of the penetrating agent must be higher, e.g., up to about 10% by weight of the dispersion or higher. A particularly useful penetrating agent for use with aqueous sols is isopropyl alcohol.

The ceramic component in the initial impregnation dispersion can be in the form of a dissolved species, a soluble or insoluble salt, a dispersion of particles (e.g., powder, flakes), or combinations of these materials. Examples of useful dissolved species include metal salt solutions such as solutions of silicates, transition metal salts, rare earth metal salts and aluminum salts; basic metal salt solutions such as basic aluminum salt solutions and basic zirconium salt solutions; and solutions of metal complexes such as carboxylates, phosphates, alkoxides, alcoholates, amine complexes and hydroxides. In the case of the present impregnating dispersions, it can be desirable for the particles used therein to be fine, with an average particle diameter of less than 4 micrometers and, preferably, less than 2 micrometers. Although a portion of the particles in the dispersion can be of larger diameter, for example about 10% by weight of the particles can be larger than about 10 micrometers, it is preferred that at least about 80% by weight of the particles be less than about 10 micrometers in diameter and at least about 95% by weight of the particles be less than about 20 micrometers in diameter. Impregnation dispersions of fine particle dimensions are preferred since the pore size in the organic binder-containing ceramic fiber paper are very small. Particularly useful ceramic components in the impregnating dispersion can include colloidal dispersions of ceramic materials and ceramic precursors such as colloidal dispersions of metal carbides (e.g., silicon carbide), metal oxides, oxy-hydroxides and hydroxides. Examples of the oxides, hydroxides and oxy-hydroxides that may be useful include colloidal nano-clays, boehmite, colloidal zirconia and colloidal silica. Certain colloidal nano-clays and colloidal dispersions of fine particle size silicon carbide, as described below, can work particularly well in the impregnating dispersions of the present invention.

It is surprising that nano-clay materials can be used to impart strength via the present rigidification process while at the same time retain a high degree of porosity in the final fiber-based paper substrate. Nano-clay materials are typically plate-like materials (i.e., in the form of platelets or flakes) that are typically used to make non-porous coatings. The U.S. Bureau of Mines classifies clays into six groups: kaolin, ball clay, fire clay, bentonite, fuller's earth, and common clay and shale (Kirk-Othmer Encyclopedia of Chemical Technology, 4$^{th}$ edition, Volume 6, John Wiley and Sons, New York, N.Y., page 405). Of the nano-clays, the bentonite clays are preferred, particularly those high in montmorillonite content. Besides their fine particles size and water dispersibility, the montmorillonite clays have the capability of being cation exchanged so as to lower the content of cations such as, for example, sodium and potassium in the montmorillonite clay. Cations such as sodium and potassium can have negative effects on the thermal stability of the resulting ceramic materials, because such cations can react to form glass materials. The cation exchange capabilities of such ceramic components can also be used to introduce cations that form catalytic oxide species during calcination and firing. Cations that can be useful in forming catalytic sites include cations of rare earth metals, precious metals, iron, nickel, manganese, cobalt, copper, chromium, barium, vanadium, titanium and combinations thereof. Thus, the nano-clays can be beneficially modified to produce a catalytic function, as well as a binding and strengthening effect.

When montmorillonite converts to chemically stabilized β-cristobalite, it exhibits material properties that contribute to the formation of a durable subtrate paper. The montmorillonite bonds wells to both the aluminum oxide fibers of the paper and the silicon carbide particles impregnated in the paper. It has been discovered that the pyrolysis (e.g., firing) of montmorillonite at or above about 900° C. can directly form a chemically stabilized β-cristobalite. The montmorillonite at least begins to bond to the fibers and particles before the montmorillonite is transformed into the β-cristobalite structure. These bonds are at least maintained upon the transformation into β-cristobalite structure. Chemically stabilized β-cristobalite also has the added advantage of its material characteristics (e.g., low coefficient of thermal expansion and high thermal shock resistance). The low thermal coefficient of expansion coupled with high temperature stability, makes chemically stabilized β cristobalite one of the best refractory materials for applications where temperatures up to 1450° C. are encountered. Calcium montmorillonite is one such montmorillonite that can form chemically stabilized β-cristobalite. Chemically stabilized β-cristobalite has basically the same crystal structure as β-cristobalite, a high temperature polymorph of $SiO_2$ (i.e., silica). Chemically stabilized β-cristobalite is formed after the dehydration of the calcium montmorillonite in the firing process. While chemically stabilized β-cristobalite has the β-cristobalite crystal structure, the chemical composition of chemically stabilized β-cristobalite is not that of pure silica.

Pure β-cristobalite is not normally stable below about 275° C. The reason chemically stabilized β-cristobalite, as used in the present invention, is stable at room temperature is because the other ions that are present in the clay (e.g., calcium, aluminum, sodium and possibly iron) remain in the β-cristobalite lattice structure, thereby stabilizing the β-cristobalite crystal structure at lower temperatures. β-cristobalite is a high temperature, low pressure polymorph of silica in which the silica tetrahedral are arranged in a diamond like lattice with shared corners. The β-cristobalite has a cubic symmetry while the alpha-cristobalite is tetragonal. In the case of pure silica, the fully expanded high temperature beta structure undergoes a reversible displacive transformation to a collapsed alpha structure on cooling at about 265° C. This is accompanied by a volume decrease of about 3.2%. The temperature of the beta to alpha inversion in chemically stabilized or doped cristobalite is variable and depends on the level of doping and the nature of the doping cations. In order to stabilize the β-cristobalite down to room temperature, it must be chemically doped with a sufficient level of stuffing cations (i.e., chemically stabilized). Preferably, these cations are uniformly dispersed in the crystal structure. In particular, in the calcia-alumina-silica system, chemically stabilized β-cristobalite can be formed where the molar ratio of calcium to aluminum is one, with aluminum occupying silicon tetrahedral sites and calcium ions occupying all of the interstitial non-framework sites. The presence of foreign ion impurities in the interstices presumably inhibits the contraction of the structure that would have occurred during the beta-alpha-cristobalite transition. Thus, the reason the chemically stabilized β-cristobalite is stable at room temperature is because there is a sufficient level of non-silicon cations substituted and stuffed into the lattice structure. It has been determined, by independent analysis, that in the chemically stabilized β-cristobalite formed by the firing of calcium montmorillonite, as described herein, the aluminum (as determined by $^{27}Al$ nuclear magnetic resonance spectroscopy) is essentially all in the tetrahedral form. This can only happen if the aluminum is in the lattice structure substituting for silicon at tetrahedral sites. Such substitution of a plus 3 aluminum cation for a plus 4 silicon cation results in a need for additional cations for electro neutrality in the crystal structure. The calcium and sodium cations from the calcium montmorillonite provide the additional charge needed to obtain this electroneutrality. While the chemically stabilized β-cristobalite of the present invention exhibits an x-ray diffraction pattern essentially identical to that of pure β-cristobalite, the composition is not that of pure silica.

The chemically stabilized β-cristobalite is also chemically distinct from the pure silica in the β-cristobalite form. Pure silica is an acidic oxide. The chemically stabilized β-cristobalite is closer in chemistry to a feldspartic mineral and acts as a basic oxide.

In the calcium montmorillonite, there is calcium, sodium, alumina and silica, as is required in the chemically stabilized β-cristobalite. So when the calcium montmorillonite is fired and decomposes, chemically stabilized β-cristobalite is naturally formed. This is a far easier and less expensive method of producing chemically stabilized β-cristobalite than previously known methods.

Chemically stabilized β cristobalite (CSC) has been synthesized by the Pechini process (see Sang-Jin Lee, Korean J. Ceramics, 3[2] 116 (1997); S. J. Lee and C. H. Lee, Mater. Lett., 45, 175 (2000)), by co-precipitation of silica with the requisite cations (see M. A. Saltzberg, S. L. Bors, H. Bergna and S. C. Winchester, J. Am. Ceram. Soc., 75[1] 89 (1992); A. J. Perrotta, D. K. Grubbs, E. S. Martin, N. R. Dando, H. A. McKinstry, and C. Y. Huang, J. Am. Ceram. Soc., 72[3] 441 (1989).), by spray drying sol-gel mixtures (see E. S. Thomas, J. G. Thompson, R. L. Withers, M. Sterns, Y. Xiao, and R. J. Kirkpatrick, J. Am. Ceram. Soc., 77[1] 49 (1994).), and by the incipient wetness technique (see M. D. Alcala, C. Real, and J. M. Criado, J. Am. Ceram. Soc., 79[6] 1681 (1996).) and by thermal treatment of an ion-exchanged zeolite (see A. J. Perrotta, D. K. Grubbs, E. S. Martin, N. R. Dando, H. A. McKinstry, and C. Y. Huang, J. Am. Ceram. Soc., 72[3] 441 (1989).). Patented methods of synthesizing β cristobalite include precipitating crystals of the β cristobalite in a glass melt (see J. F. MacDowell, "Alpha and Beta-Cristobalite Glass-Ceramic Articles and Methods", U.S. Pat. No. 3,445,252, issued May 20, 1969; C. T. Li, "Glasses, Thermally Stable High (Beta)-Cristobalite Glass-Ceramics and Method", U.S. Pat. No. 4,073,655, issued Feb. 14, 1978. ) and a sol-gel process (see A. J. Perrotta, D. K. Grubbs, and E. S. Martin, "Process for Preparing Stabilized High Cristobalite" U.S. Pat. No. 4,818,729, issued Apr. 4, 1989. ). These methods of preparation suffer from high cost and difficulty in synthesizing phase pure, chemically stabilized β cristobalite.

Surprisingly, it has been discovered that essentially or at least substantially phase pure, chemically stabilized β cristobalite can be synthesized by thermal treatment of a montmorillonite clay such as, for example, a calcium montmorillonite clay. Calcium montmorillonite clay is relatively inexpensive and readily available. Further, calcium montmorillonite clay can be introduced into sol-gel compositions or mixed dispersions to generate the chemically stabilized β cristobalite during firing. In this fashion, the low thermal coefficient of expansion of the chemically stabilized β cristobalite can be used to impart greater thermal stability and thermal shock resistance to the ceramic body. If desired, the montmorillonite clay can be combined with glass precursor materials so as to generate a chemically stabilized β cristobalite glass that is toughened and thermally shock stable. It has been further discovered that the calcium montmorillonite can be ion-exchanged with other cations such as, for example, $Cu^{2+}$, $Co^{2+}$, $Ni^{2+}$, $Fe^{2+}$, $Sr^{2+}$, $K^{1+}$, and $Nh_4^{1+}$, etc. to yield, after firing, a variety of CSCs having different compositions.

The exemplary montmorillonite that has been shown to convert to chemically stabilized β cristobalite by heating is a calcium montmorillonite and has been reported to have the general composition recited in the below table as Standard Bentolite SSP. In this table is also shown the composition of a low sodium version of this product. This illustrates the ion-exchangeable nature of calcium montmorillonite and also points out the ions that are exchanged in this process.

| Standard Bentolite SSP* | Weight Percent | Low Soda Bentolite | Weight Perent |
|---|---|---|---|
| Na2O | 2.52 | Na2O | 0.4 |
| MgO | 3.06 | MgO | 2.67 |
| $Al_2O_3$ | 13.8 | $Al_2O_3$ | 15.0 |
| $SiO_2$ | 64.4 | $SiO_2$ | 68.6 |
| $K_2O$ | 0.25 | $K_2O$ | 0.27 |
| CaO | 2.01 | CaO | 1.55 |
| $Fe_2O_3$ | 1.06 | $Fe_2O_3$ | 0.22 |
| $TiO_2$ | 0.02 | $TiO_2$ | 1.08 |

*Bentolite SSP is a product produced and distributed by Southern Clay Products, Incorporated, Gonzales, Texas.

Montmorillonites clays are classed as dioctahedral smectites and are layered compounds wherein the outer surface of each individual layer is comprised of $MO_4$ tetrahedra connected to neighboring tetrahedra by shared oxygens forming a hexagonal pattern of tetrahedra. In general, the metal ions are predominantly $Si^{4+}$ but substitution of $Al^{3+}$ or $Fe^{3+}$ for $Si^{4+}$ can occur. The two surfaces of each layer sandwich an inner layer comprised of octahedrally coordinated metal ions in which one oxygen from each of the outer surface tetrahedra bond to the metal in the octahedral layer. Three out of the four oxygens on each surface tetrahedron are shared with neighboring metal ions and the fourth of the tetrahedral oxygens are shared with the inner octahedral metal ions. Anionic charge on the layers arises from substitution of a $M^{3+}$ cation for $Si^{4+}$ cation in the tetrahedral layer or by substitution of a $M^{2+}$ cation for an $M^{3+}$ cation in the octahedral layer. This charge is compensated by interlayer cations such as $Na^+$, $Al^{3+}$, $K^+$, $Mg^{2+}$, and $H^+$. Thus, a possible composition of the Bentolite SSP montmorillonite is $[(Al_{2.03}Mg_{0.50}Ca_{0.2}Fe_{0.05}Ti_{0.05}K_{0.02})Si_8O_{20}(OH)_4]$ $(Na_{0.3}Ca_{0.06}Mg_{0.07})$. This formula, although approximate, illustrates the general ratio of the aluminum to the silicon and also indicates the exchangeable cations (i.e., those shown in parenthesis at the end of the formula).

Studies were done on the pyrolysis product of pure Bentolite SSP to more closely examine the nature of the beta cristobalite that is formed. Microanalysis shows a composition of the Bentolite SSP after firing of about 16.5% $Al_2O_3$, 1.9% CaO, 1.15% $Fe_2O_3$, 2.7% $Na_2O$, and 74.0% $SiO_2$. Since X-ray diffraction shows this material to be essentially monophasic, the material is a heavily doped beta cristobalite. Chemically, the material is very similar in composition to certain feldspars, although lower in the total of potassium plus sodium and somewhat higher in calcia (e.g., pegmatite feldspar is 74.34% $SiO_2$, 14.45% $Al_2O_3$, 2.0% $Na_2O$ and 8.6% $K_2O$)

In the literature, such materials, although highly doped, are still referred to as beta cristobalites (see for instance: E. S. Thomas, J. G. Thompson, R. L. Withers, M. Stems, Y. Ziao and R. J. Kirkpatrick, J. Am. Ceram. Soc., 77[1] 49-56 (1994); A. Perrotta, D. Grubbs, E. Martin, N. Dando, H. McKinstry, and C. Huang, J. Am. Ceram. Soc. 72[3] 441-47 (1989); M. D. Alcala, C. Real, and J. Criado, J. Am. Ceram. Soc., 79[6] 1681-84 (1996); C. Li, "Glasses, Thermally Stable High (beta) Cristobalite Glass-Cermaics and Method", U.S. Pat. No. 4,073,655, Apr. 4, 1977; A. Perrotta, D. Grubbs, and E. Martin, "Process for Preparing Stabilized High Cristobalite", U.S. Pat. No. 4,818,729, 10, 13, 1987).

Additionally, in all cases, the firing of bentolite SSP either by itself or in combination with the filter ingredients, produces chemically stabilized beta-cristobalite as the major product. Thus, the composition of the impregnation solutions may be changed slightly (e.g., the ratio between silicon carbide and the nano-clays or other ceramic components, such as alumina, may be added in the ceramic binder material), without affecting whether beta-cristobalite will be formed.

Nano-clays such as the montmorillonite clays, in the presence of suitable penetrating agents, can readily penetrate the organic binder-containing green ceramic fiber paper during impregnation. Penetrating agents that are particularly suitable for montmorillonite clays include the anionic penetrating agents. The particle size of the individual nano-clay particles in the impregnating dispersion is sufficiently small (less than about 2 micrometers in primary dimension) so as not to obstruct the pores of the organic binder-containing green paper. Importantly, during the initial processing, the nano-clays adsorb onto the ceramic fibers in the green paper. It is believed that most of this nano-clay adsorbtion occurs during the impregnation stage, but may also occur during drying, calcining or both. Firing of the nano-clay impregnated, green ceramic fiber paper results in chemical bonding of the nano-clays to the ceramic fibers. In this way, the nano-clays rigidify the ceramic fiber network. In addition, the nano-clays possess both positively and negatively charged surfaces. This phenomenon arises from the fact that the nano-clays have a layered structure and possess a platelet morphology. The edges of the nano-clay platelets are crystallographically and elementally distinct from the faces of the nano-clay platelets. Thus, in most cases, in acidic to slightly basic pHs, the edges of the nano-clay platelets are characterized by a cationic charge whereas the faces are anionic. Because the faces predominate in terms of surface area, the overall charge of the nano-clays in most of the pH range is negative. Thus, while not wishing to be bound by theory, it is believed that the negative nature of the nano-clays promotes adsorption of the nano-clays onto the ceramic fibers in the pH range, generally from about 2.5 to about 8.5, where the ceramic fibers are cationic and the nano-clays are anionic. This pH range can vary depending on the nature of the nano-clay, i.e., depending on the composition and exchangeable cation content and identity. Within this pH range however, the edges of the nano-clays remain cationic. Ceramic component particles of the present impregnating dispersion that are particularly useful in the instant invention (e.g., silicon carbide particles) have negative surfaces above a pH of about 2. Thus, the cationic sites on the edges of the nano-clays interact with the anionic sites on the ceramic component particulate with the result that the ceramic component particulate, the ceramic fibers and the nano-clays are bound together in the fiber-based paper substrate structure.

The anionic nature of the nano-clays also allows the bonding of cationic strengthening additives such as hydrated aluminas, zirconia or the like (e.g., in particle form), because the nano-clays bond to both the ceramic fibers and these strengthening additives. In general though, if large amounts of finely divided particles such as aluminas and zirconias are used (i.e., enough to negate the anionic nature of the nano-clays), the interaction of the nano-clays with the ceramic fibers can be prevented with detrimental effects on the strength of the fiber-based paper substrate. For this reason, it is believed that the ceramic component of the impregnating dispersion can beneficially include cationic or strengthening additives (e.g., in particle form) at levels where the external surface area of the added cationic particles can be up to about 90% of the available external surface area of the nano-clay particles in the formulation. In other words, it is believed that up to about 90% of the external surface of the nano-clay particles can be bound up by the cationic particles and sufficient bonding to the ceramic fibers can still result.

A most convenient method of introducing particles such as aluminas and zirconias into the instant invention is to treat the oxide particles in such a manner as to convert their surface charge from cationic to anionic. In this way, the nano-clays can freely interact (i.e., chemically bond, electrostatically attract or both) with both the ceramic fibers and the oxide particles in the fiber-based paper substrate. Methods of converting normally cationic particles to anionic particles include the following technologies: (1) treating the oxide particles with a polyanionic material such as, for example, polycarboxylic acid functional polymers and their salts, polysulfinated functional polymers and their salts, polyphosphate functional polymers and their salts, polymethacrylic acids and their salts, or the like so that the polyanionic material is adsorbed on the surfaces of the oxide particles, thereby making the oxide particles negatively charged; (2) treating the oxide particles with a polyvalent anionic salt or complexes such as tartrates, citrates or the like so that the anionic salt or complex is absorbed on the surface of the cationic particle, thereby rendering the oxide particle negatively charged; and (3) coating the oxide particle with an oxide colloid or coating that is itself negatively charged. An example of this latter method is the formation of silica-coated oxide particles formed via treatment of the oxide particles with sodium silicate or another hydrolyzable metal complex so as to deposit, by hydrolysis, an oxide coating of the silicate on the surfaces of the oxide particles.

It has been found to be particularly effective to use small size ceramic component particulate (e.g., silicon carbide particles) with nano-clay particles in impregnating dispersions of the present invention. Small size ceramic particulates can be readily dispersed in a nonoclay particle dispersion to form stable dispersions that settle slowly (i.e., that stay suspended for longer periods). In addition, the small size of the ceramic component particulates can facilitate the impregnation of the dispersion into the ceramic fiber paper of the substrate. The small size of the ceramic particulates also allow for lower temperature bonding of the ceramic particles, during firing, in order strengthen the resulting porous fiber-based paper substrate. In the impregnation of the green fiber-based paper substrate, it can be desirable for the particle size of the ceramic component particulate to be less than about 4 micrometers in average particle diameter and, preferably, less than about 2 micrometers in average particle diameter. Particle sizes of about 1 micrometer or finer in average particle diameter can also be used effectively. Although a portion of the ceramic component particles in the dispersion can be of larger diameter, for example about 10% by weight of the ceramic component particles can be larger than about 10 micrometers, it is preferred that at least about 80% by weight of the ceramic component particles be less than about 10 micrometers in diameter and at least about 95% by weight of the ceramic component particles be less than about 20 micrometers in diameter. In general, the surfaces of the silicon carbide particles, and of other such ceramic component particles, are anionic in surface charge. Such particulate can, thus, bond to both the cationic ceramic fibers and to the cationic portions of the nano-clay particles. Surprisingly, when used with a suitable penetrating agent, ceramic component particles, like the silicon carbide particles, and nano-clay particles can readily penetrate the green paper.

During calcination and firing, the nano-clay particles, ceramic component particles (e.g., silicon carbide particles) and other ceramic additives (e.g., basic metal salts, particulate metal oxides and oxy-hydroxides) bond to themselves and to the ceramic fibers and, thereby, bond the ceramic fibers together so as to form a strong yet flexible ceramic fiber paper.

Referring to FIGS. 4-7, scanning electron microscopic (SEM) examination of the cross-sectioned initially fired ceramic fiber paper reveals that its microstructure contains refractory ceramic fibers 28 bound together at spaced locations along and at intersections of the fibers 28 by ceramic particle-derived filleting material 30. Prior gas phase deposition techniques, used in an attempt to rigidify fiber-based substrates, produce a relatively uniform and continuous coating of the rigidifying material. Unlike fiber-based substrates rigidified using gas phase deposition techniques, the ceramic fibers 28 in the present inventive paper are not uniformly coated with a continuous coating of the impregnating dispersion. Rather, the ceramic particles 30 introduced into the paper by the impregnating dispersion are bound to the surfaces of the ceramic fibers 28 (e.g., see FIGS. 7 and 10) at spaced locations along and at intersections of the ceramic fibers 28 (e.g., see Ref. No. 34 in FIGS. 5 and 10). In this way, by the fibers 28 being bonded together at spaced locations along the fiber length, and not being uniformly and continuously coated, the ceramic fibers 28 of the present paper retain much of their original flexibility. In addition, referring to FIGS. 4-7, the interior of the walls of the fiber-based paper substrate 10 is characterized by pores 32 having surfaces comprising ceramic fibers 28 as well as ceramic agglomerates 34 of the bound, impregnating particles 30. The particles 30 can also be present separately (i.e., not agglomerated) as well as in the form of agglomerates 34. The initial rigidification process, typically, strengthens the fiber-based paper substrate enough so it can at least survive subsequent rigidification processes.

The ceramic fibers 28 in the rigidified ceramic fiber paper, after one or more rigidification processes, are somewhat oriented (i.e., not completely random in their orientation). SEM examination of cross-sections of the rigidified ceramic fiber paper reveals that in general greater than about 60% of the fibers 28 in the ceramic paper are aligned within about 35° of being parallel with the plane of the ceramic paper. These fibers 28 are intertwined with each other, being bound to each other by particulate ceramic material 30 and having particulate ceramic materials 30 bound at random points along their length. After the first impregnation, the structure of the pores 32 seems for the most part to be uniformly random through the paper, although the orientation of the fibers 28 produces some orientation of the larger pores 32 in the plane of the paper.

Despite the fact that the present particulate containing dispersion is being impregnated into a green, organic binder-containing, ceramic fiber paper, very little free or unbound particulate material 30 can be observed, using SEM examination, in the rigidified structure of the ceramic fiber-based paper substrate. It is this absence of free or unbound ceramic particles 30 in the rigidified ceramic fiber-based paper substrate 10 that causes the substrate to exhibit low dusting behavior. High dust content in the rigidified ceramic fiber-based paper substrate can be indicative of poor bonding of the ceramic fibers by the ceramic component particles. It may also be detrimental if such free or unbound particles are expelled from the exhaust system during use.

Colloidal silica or dispersions of silica can also be used to advantage in the present impregnating sols. The colloidal silica provides strength to the fiber-based paper substrate by bonding the fiber strands together. Excessive use of silica, however, was found to increase the brittleness of the substrate body and to increase the degree of dusting. Excessive use of silica can also reduce the chemical stability of the fired fiber-based paper substrate. In an attempt to avoid such drawbacks of using silica, it has been found that it can be desirable for the silica to be used as an additive at a level of less than about 45%, more desirably less than about 35%, preferably less than about 25% and more preferably less than about 15% by weight of the solids in the impregnating sol. It can also be desirable for the silica level in the final ceramic fiber-based paper substrate, as introduced via impregnation, to be at a level of less than about 10%, more desirably less than about 7%, preferably less than about 4% and more preferably less than about 1% by weight of the substrate.

Colloidal boehmite (i.e., alpha alumina monohydrate) may also be used as a ceramic component in the impregnating sol. The colloidal boehmite can act to bond certain ceramic fibers, particularly those containing silicon. The colloidal boehmite is particularly effective, when used in combination with colloidal silica. An advantage of the introduction of boehmite is that during calcination it converts to a high surface area transition alumina that can serve as a catalyst support for metal-based catalysts. Transition aluminas are excellent catalyst supports because of their very high surface area. They are, however, unstable with respect to transformation to the alpha phase at elevated temperatures. Such transformation is accompanied by significant shrinkage of the alumina crystal structure. Such shrinkage can cause loss of strength in the ceramic fiber substrate. For this reason, stabilizing ions can be introduced into the transition alumina crystal structure to raise the temperature of the alpha alumina transformation. This stabilization can be accomplished by introducing into the substrate during a second impregnation a small amount, up to about 20% by weight of alumina, of rare earth ions in soluble form, of silicon complexes in soluble form, of silica in colloid form, of barium ions in soluble form or combinations thereof.

By combining nano-clays and dispersions of silicon carbide, silica, and boehmite with penetrating agents, impregnating dispersions can be prepared that yield ceramic fiber-based paper substrates that are strong, handleable and exhibit high porosity after being impregnated, dried, calcined and fired. These materials (nano-clays, silicon carbide, silica and boehmite) can serve as the basis for excellent ceramic fiber-based paper substrates according to the present invention, particularly when combined with subsequent impregnations of strength building ceramic components, like those described herein, and of catalysts. Satisfactory substrates according to the present invention can also be obtained without using silica and boehmite. The penetrating agent is optional after the first rigidification process.

The strength of the ceramic fiber-based paper substrate can be dramatically increased by being subjected to at least a second rigidification process (i.e., impregnating, drying, calcining and firing). Similar impregnating dispersions can be used in subsequent rigidification processes to increase the strength and durability of the substrate, to impart catalytic activity to the substrate, or both. In general, with such subsequent rigidification processes, the use of penetrating agents is optional and larger ceramic particles and ceramic precursor particles in the impregnating dispersion, for example, average particle diameters of up to 5 micrometers or even larger, can be successfully introduced in these subsequent rigidification processes. In general, after the first rigidification process (i.e., after the organic binders have been removed), the ceramic fiber-based paper substrate can be impregnated, dried, calcined and fired again, although before being fired again, another impregnation can be carried out after only a drying step or after drying and calcining steps.

Figure 8:
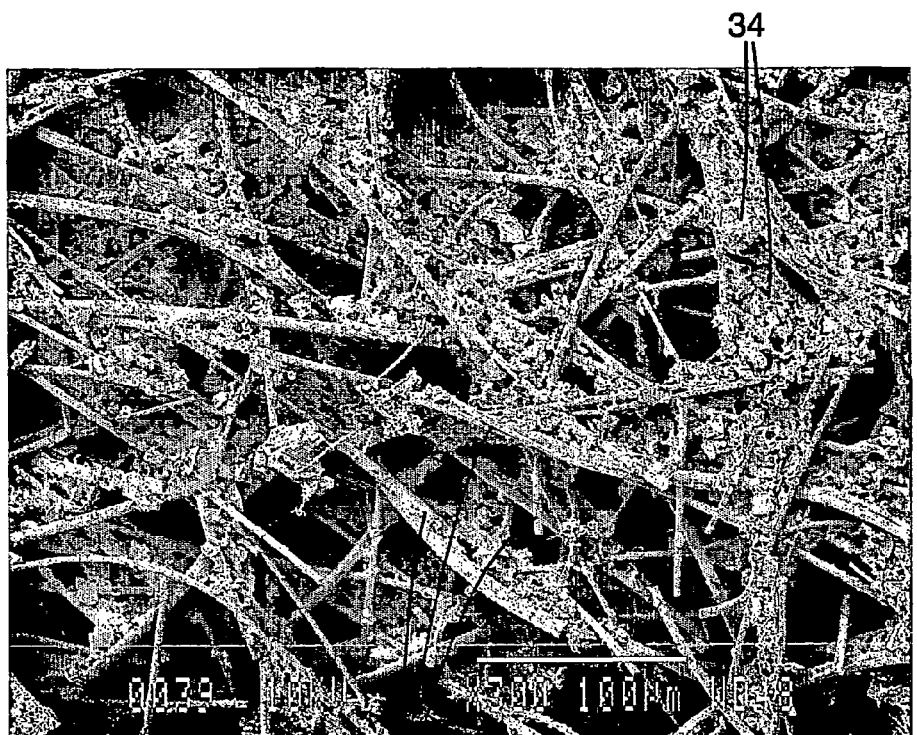
FIG. 8 is a 300× magnification photomicrograph of the surface of a ceramic fiber paper that has been impregnated, dried, calcined and fired twice according to the present invention.
Figure 9:
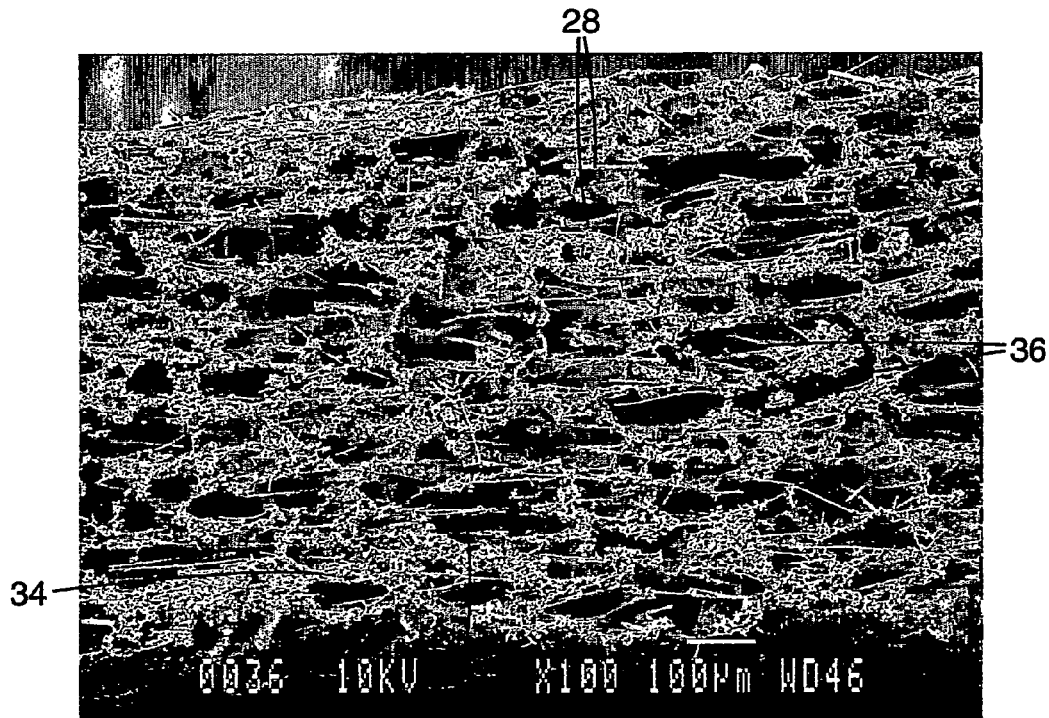
FIG. 9 is a 100× magnification photomicrograph of a cross-sectioned ceramic fiber paper that has been impregnated, dried, calcined and fired twice according to the present invention.
Figure 10:
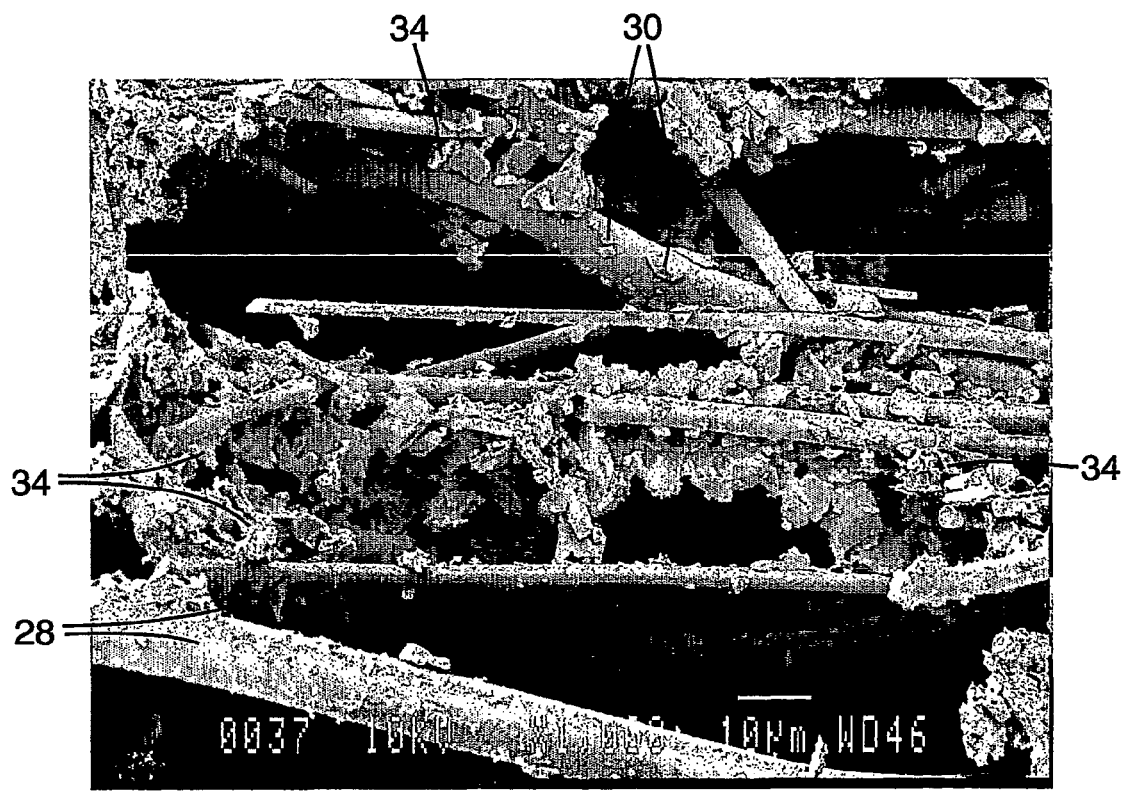
FIG. 10 is a 1,000× magnification photomicrograph of a cross-sectioned ceramic fiber paper after having been impregnated, dried, calcined and fired twice according to the present invention.

Referring to FIGS. 8-10, ceramic fiber-based paper, which was subjected to a first and second rigidification process, was sectioned and the cross-section of the paper examined by scanning electron microscopy. Surprisingly, after the second rigidification process (i.e., impregnating, drying, calcining and firing), the microstructure of the paper changes dramatically. In addition to the further densification of the paper due to the introduction of additional ceramic material 30 from the second impregnation, this cross-sectional examination also revealed that the second rigidification process can induce the formation of a distribution of lenticular or plate-like pores 36 inside of the ceramic fiber/organic binder composite paper. For the sample of ceramic fiber-based paper examined, the long axes of these pores 36 were typically in the range of from about 50 to about 300 micrometers in length and in the range of from about 10 to about 50 micrometers in height. The long axes of these plate-like pores 36 are aligned close to parallel with the plane of the ceramic paper. The internal structure of this rigidified paper can be characterized as being similar to that of open-celled foams having elongated or plate-like pores. The pores 36 have porous boundaries formed by particle-bonded ceramic fibers. The boundaries can be jagged or irregular. The density of the ceramic bonding material 30 can be slightly higher on the surfaces of the paper. When the cross-section of the paper is viewed by scanning electron microscopy at a magnification of 100 times, see FIG. 9, the density of the ceramic bonding material 30 appears to be uniform through the interior of the paper. While not wishing to be bound by theory, it is believed that the unique structure of the rigidified paper of the present invention enables the present rigidified fiber-based paper substrates to be strong and durable yet sufficiently porous to function as excellent filters, catalyst supports or both.

The ceramic particles 30 (e.g., silicon carbide particles, metal oxide particles, etc.) in the rigidified ceramic fiber paper do not form a phase that is contiguous (i.e., the particles 30 typically form a discontiguous phase) throughout the rigidified paper substrate 10. In addition, the ceramic particles 30 typically do not form a continuous coating (i.e., the particles 30 typically form a discontinuous coating) on the fibers 28 within the paper. Instead, the particles 30 are typically found in discontinuous agglomerates 34 that help to bond the fibers 28 together. Some of the agglomerates 34 are typically bound to adjacent agglomerates 34 within the paper. Even so, it may be desirable to apply the ceramic particles 30 so as to form a continuous coating on the fibers 28, a continuous matrix in the body of the rigidified substrate 10 or both.

Silicon carbide and silicon oxy-carbide are particularly useful ceramic components in making a versatile, high performance, ceramic fiber-based paper substrate. Either or both of these components can be introduced in the paper-making process or added in one or more than one impregnation operation. These carbides of silicon are desirable because they can thermally bond to oxide ceramic fibers to form a porous refractory composite paper material that is chemically and thermally stable, strong and durable. After being processed through at least one rigidification operation, these carbide materials are capable of absorbing microwave energy to enable microwave heating of the rigidified fiber-based paper substrate. Such microwave compatibility can be desired for regeneration purposes. In addition, these carbide materials in the rigidified fiber-based paper substrate possess good thermal conductivity and including them raises the thermal conductivity of the rigidified substrate. Higher thermal conductivity can be desired, because it can allow heat to dissipate from hotter spots in the fiber-based paper substrate, during use. It has been found that the combination of these carbides of silicon with ceramic fibers containing aluminum and/or aluminum compounds (e.g., aluminum oxide) can be particularly advantageous, since the rigidified composite paper materials that are formed are stronger, more thermally stable and less brittle than rigidified composite paper materials formed from either silicon carbide or silicon oxy-carbide alone.

The twice rigidified ceramic fiber-based paper substrate can be further processed by one or more additional rigidification treatments to increase the strength and durability of the substrate and to change the nature of the surface of the substrate.

Exterior surfaces of at least a once rigidified, and preferably at least twice rigidified, ceramic fiber-based paper substrate of the present invention can be selectively hardened by the application of a durable ceramic coating. Such a ceramic coating can provide a durable surface to reduce wear of the porous fiber-based paper substrate resulting from the abrasive effect of exhaust gas, produced for example by a diesel engine, passing through the substrate. Such a ceramic coating can also be applied so as to strengthen and reinforce the plugs and prevent holes from forming through or around the plug material. These ceramic coatings can also be applied to the non-filtering surfaces of the ceramic fiber-based paper substrate to increase the crush strength of the substrate so a to allow higher mounting pressures to be used during the canning process. Higher mounting pressures can help to stabilize the substrate in a housing. Ceramic coatings that can be useful in this regard include glass-ceramic coatings derived from mixtures of ceramic particles with glass particles, clay-bonded ceramic coatings comprising ceramic particles such as, for example, particles containing aluminum and/or aluminum compounds (e.g., aluminum oxide), silicon-containing particles or metal carbide particles bound together by a ceramic material derived from a clay, and coatings derived from ceramic precursor sols such as basic metal salt solutions, metal salt solutions, partially hydrolyzed metal alkoxides, and materials derived therefrom.

In general it is desirable for a ceramic fiber-based paper wall-flow substrate or filter used for the purification of diesel exhaust fumes to capture particulate exhaust byproducts and enable the oxidation of these particles so as to prevent excessive accumulation of soot in the filter. Such an accumulation of soot causes the filtration pressure or back pressure to increase and eventually results in the failure of the filter. The soot can be oxidized by the application of thermal energy, but in general, the temperatures needed to achieve complete oxidation of the soot are higher than are normally developed in a diesel engine exhaust. The filter of the invention may be used in an exhaust system that includes a way to raise the temperature of the filter through the use of an external energy source. This may be accomplished by the use of any conventional technique including, for example, microwave energy, resistive heating, and the combustion of fuel added into the exhaust stream.

In another embodiment of the invention, both the wall-flow and flow-through substrate of the present invention can be treated with solutions or dispersions of catalyst materials or catalyst precursors so as to activate the ceramic fiber-based paper substrate as a catalyst support. Additionally or alternatively, catalytic materials can be introduced during the formation of the substrate so as to become an integral part of the ceramic fiber-based paper substrate. Catalyzed filters can be used in combination with other catalyst systems and regeneration technologies so as to produce an exhaust system that is highly efficient at removing particulate and gaseous impurities from internal combustion engine exhaust fumes or from other hot gases.

The fiber-based paper substrates of the invention may be used to support a number of different kinds of catalysts to assist in the oxidation of carbonaceous materials (e.g., soot, CO, hydrocarbons) and in the reduction of other pollutants (e.g., $NO_x$) in the combustion device exhaust. One way to catalyze a fiber-based paper substrate of the present invention is to introduce catalyst precursors, catalytic materials or a combination thereof at one or more points in the substrate manufacturing process. Such catalytic components can be introduced in the initial paper-making process, in one or more of the impregnation steps, by being applied to the rigidified fiber-based paper substrate body or a combination thereof. Suitable catalytic materials can include materials comprising metals such as platinum, palladium, rhodium, iron, nickel, silver, ruthenium, copper or combinations and alloys of these metals and compounds of these metals and metal oxides such as iron oxide, copper oxide, alkaline earth oxides and alkaline earth aluminates, rare earth oxides, rare earth aluminates, cerium oxide, vanadium oxide, manganese oxide, cobalt oxide, first row transition metal—rare earth metal oxide compounds and mixtures, oxides having perovskite and perovskite-related crystal structures, metal phosphates and phosphate—oxide mixtures.

In one form the catalyst(s) can be present as particles of catalyst material(s) or catalyst material(s) on support particles, where the particles are adsorbed on the surface of the ceramic fibers and ceramic component material of the ceramic fiber-based paper substrate of the present invention. A catalytic metal, mixed metal or metal alloy can be supported directly on the ceramic fibers and ceramic component material or can be supported on a catalytic oxide material which is then applied directly to the fibers and ceramic component material. These catalysts can also be present as partial coatings on the surfaces of the ceramic fibers and ceramic component materials of the fiber-based substrate of the present invention.

The catalytic metal or metal compound can be applied to the fiber-based paper substrate as a metal salt solution. The metal salt can then be either chemically altered (e.g., chemically reduced) to the active metal form, or thermally decomposed to the active metal form, so as to adsorb on the ceramic fibers and ceramic component material and impart catalytic activity. The catalytic metal or metal compound can also be formed as a colloidal dispersion or adsorbed on a colloidal carrier and then applied to the ceramic fibers and ceramic component material by dipping or other impregnation techniques. Catalytic metals or metal compounds can also be applied by conventional gas phase deposition techniques.

The fiber-based paper substrates of the present invention can be used in conjunction with other catalytic substrates and catalytic materials (e.g., $NO_x$). $NO_x$ reduction catalysts include, for example, rhodium supported on alumina, ceria or alumina-ceria, and can be used in conjunction with the fiber-based paper substrates of the present invention to remove $NO_x$ from the exhaust gases, for example, by reducing the $NO_x$ to nitrogen (i.e., $N_2$) gas. If desired, $NO_x$ oxidation catalysts can also be used in conjunction with the fiber-based paper substrates of the present invention. With $NO_x$ oxidation catalysts, the $NO_x$ is oxidized to $NO_2$, and the $NO_2$ can be used to assist in the oxidation of carbonaceous material (e.g., soot trapped in a filter). $NO_x$ oxidation catalysts can be supported on a filter or other substrate of the present invention, if desired, so as to generate the higher oxidation state nitrogen oxides in situ.

All percentages are weight percent unless otherwise indicated.

TEST METHODS

Strength and Stiffness

The strength and the stiffness of an impregnated, calcined, and fired (i.e., rigidified) ceramic fiber paper was measured using a MTS Sintech 10D (Minneapolis, Minn.) testing workstation. A 9 cm×9 cm square ceramic paper test specimen was mounted between two metal plates, each having a 2.5 cm hole. The rig with the plates was immobilized and a 2.85 mm diameter, flat-tipped rod was brought into contact with the specimen at the center of the hole. The test was run at a crosshead speed of 1 mm/min. and the force required to punch the rod through the paper was recorded using a 25 N capacity load cell. The load-vs-displacement curves were recorded using a digital data acquisition system. The Peak load was taken as the highest load in the load-displacement curve and recorded in grams. Stiffness was measured as the slope of the linear portion of the initial rise in the load-displacement curve and was recorded in Newtons/millimeter (N/mm).

Gas Permeability

The gas permeability of a ceramic fiber paper was determined according to ASTM D737-75 ("Standard Test Method for Air Permeability of Textile Fabrics") using a Geppert Engineering model MN0034 permeability tester (Geppert Engineering, Inc., St. Paul, Minn.). The test chamber was a 45.7 cm tube with an inside diameter of 7.0 cm. The ceramic fiber paper sample was mounted on the inlet end of the tube using a circular rubber-faced specimen holder to avoid damaging the sample during the test. A plate with a 4.0 mm test orifice was mounted on the other end of the tube. Air was pulled through the tube, passing through the filter, the test chamber, and the 4 mm orifice, using a Model HP33P vacuum blower (Clements National Company, Chicago, Ill.) with a variable autotransformer operating at 120 volts power to adjust the blower speed. Manometers were used to measure the pressure within the test chamber and on the vacuum side of the test chamber.

The sample was tested by mounting the sample in specimen holder on the inlet side of the test chamber. The vacuum blower speed was adjusted until the pressure in the test chamber was 1.28 cm of water. While holding the test chamber pressure at 1.28 cm of water, the permeability was determined using the pressure measurements from the test chamber and on the vacuum side of the 4 mm test orifice. The permeability was determined in cubic feet per minute per square foot and converted to cubic centimeters per second per square centimeter ($cc/sec/cm^2$).

The strength and permeability tests were performed on paper coupons in order to optimize the impregnation process and ceramic fiber paper properties prior to forming the paper into a fiber-based paper substrate according to the present invention.

Efficiency and Soot Holding Test

A finished pleated paper filter was prepared for testing by wrapping a filter measuring approximately 14.4 cm in diameter by 15.2 cm long with a ceramic fiber mounting mat (Interam™ 1100HT Mounting Mat available from Minnesota Mining & Manufacturing Co., St. Paul Minn.) and placing the filter in a 304 stainless steel tourniquet sleeve measuring about 15 cm in diameter and about 15.2 cm in length. The sleeve was tightened to compress the mat, which has a density of about 1540 grams per square meter, to a thickness of about 6 mm using a strap tourniquet and hose clamps and then spot welded. Stainless steel rings were spot welded to the ends of the sleeve. The sleeve was wrapped with a second mat (Interam™100 available from Minnesota Mining & Manufacturing Co., St. Paul Minn.) and the wrapped sleeve was press-fitted into a metal test canister and heated in a kiln to a temperature of 600° C. to expand the intumescent mounting mat. The metal test canister simulates a diesel filter canister. The canned filter was weighed, thermocouples positioned, and end cones were bolted on each end of the canister. The canned filter was weighed again with the end cones.

The canned filter was then taken and mounted onto the exhaust pipe of a 6A3.4 Cummins diesel engine. The exhaust pipe had sampling ports before and after the canned filter in which sample efficiency filter holders were mounted. The ports were located ten pipe diameters from the nearest flow transition. Two sample efficiency filters were used for the inlet port and two were used for the outlet port. The sample efficiency filters were Pallflex Membrane quartz filters (available from Pall Corp., Ann Arbor, Mich.) and were conditioned and stored in the filter holders in an oven at 82° C. for at least 4 hours before using. The engine exhaust by-passed the filter until an engine coolant temperature of about 95° C. was attained. The engine speed was set at 2400 revolutions per minute and the hydraulic pressure load was about 12.4 megapascals. Once the desired engine speed and pressure load were reached, the settings were maintained by a Dimension engine controller (Research Inc., Minneapolis, Minn.)). At this point, the exhaust gas was switched to flow through the filter. Load time was recorded. The engine was run until the pressure drop across the filter reached about 10 kPa or 20 kPa, as indicated in the test results. Once the desired pressure drop was reached, the time was recorded, and the exhaust gas was sampled for 2 minutes through the sampling ports. Flow rate through the ports was about 80 liters per minute. The raw gas sampling procedure that was used is described in SAE Paper 950516 (Nathan R. Bruner). Then the exhaust was switched to the by-pass line, and the engine was brought to idle. The canister was removed and cooled for at least an hour. The filter was weighed to calculate the soot accumulated by the filter in grams. The filter was then mounted back on the exhaust line. The engine speed and hydraulic pressure load were brought up to operating conditions in the by-pass mode and then the exhaust line was switched to the filter. The engine was run until the next pressure drop was reached, usually 40 kPa.

The efficiency of a filter was measured by sampling and measuring the mass of particulate material in a volume of the exhaust stream before the filter and the exhaust stream that had passed through the filter. The two Pallflex™Membrane Filters were removed from the filter holders of each of the ports and placed in a petri dish with the filter faces facing each other to prevent soot loss, and conditioned for 8 hours at 25° C. and 55% relative humidity before weighing. The percent efficiency was based on the particulate mass collected before and after the filtering according to the following equation:

$$\text{Efficiency \%} = (1 - ((DS_{Sooted} - DS_{Clean})/(US_{Sooted} - US_{Clean}))) \times 100$$

wherein $DS_{Sooted}$ is the weight of the soot and filter paper downstream from the filter, $DS_{Clean}$ is the weight of the filter paper downstream from the filter, $US_{Sooted}$ is the weight of the soot and filter paper upstream from the filter, and $US_{Clean}$ is the weight of the filter paper upstream from the filter.

A useful filter should have an efficiency greater than about 70% and it is desired that a high performance exhaust filter have an efficiency greater than about 85% and preferably greater than about 90% and most preferably greater than about 95%.

Preparation of Green Ceramic Fiber-Based Paper

A green ceramic fiber-based paper having about 72% by weight Saffil RF ceramic fibers (Saffil Ltd., Widnes, Cheshire UK), 4% Hycar 26-138 acrylic latex polymer (BF Goodrich, Cleveland, Ohio), 12% cellulose fibers (Crestbrook Pine, Crestbrook Forest Industries, Ltd., Cranbrook, British Columbia, Canada), and 12% fibrillated fibers (E. I. Dupont de Nemours and Company, Wilmington, Del.), was prepared using a typical paper making process. A paper pulp was formed by blending the fibers and latex in water to produce a slurry having a total solids of about 2%. A sufficient amount of an aqueous solution of approximately 70% ammonium aluminum sulfate was added to adjust the pH to between 5-6 and to coagulate the latex polymer. The slurry was poured onto a metal screen to form the paper. The paper was wet pressed slightly before drying. The resulting green ceramic fiber paper had a basis weight of about 140 grams per square meter and an average thickness of about 0.85 mm. Sheets of the paper were cut into 9 cm×9 cm square coupons for further treating and testing.

Preparation of Green Ceramic Fiber Filter

A green, ceramic fiber paper filter element was prepared by pleating the above-described green ceramic fiber paper to form approximately equilateral triangular cross sections having a length of about 3.2-3.5 mm on an edge. The pleated paper was laminated to a second flat, green, ceramic fiber paper to form a laminate. The laminate was wound around itself 16 times to form a cylindrical, green, ceramic fiber paper filter element having a diameter of about 14.4 cm and a length of about 15.2 cm. Prior to laminating, a plug material was extruded onto one end portion of the channel formed by the intersection of the pleated paper with the flat paper during lamination. The other end portion of the channel on the opposite side of the paper was likewise filled, and the laminate was wound so as to seal the opposite ends of alternating channels in the green, ceramic fiber paper filter element. The width of the plug material was approximately 10-15 mm. The plug material was prepared by mixing 23 grams of calcined alumina (Alcoa A-2/particle size ~5 micrometer (μm) available from Alcoa World Alumina LLC, Pittsburg Pa.), 45 grams of tabular alumina (48M/particle size approximately 150 μm available from C-E Minerals, King of Prussia Pa.), 30 grams of silicon carbide (F-500/particle size approximately 13 μm available from Exolon-ESK, Tonawanda N.Y.), 5 grams of a latex binder (Hycar 26315 available from BF Goodrich Co., Cleveland Ohio), and about 0.5 grams of colloidal alumina (AL-20 available from Nyacol Nano Technologies, Inc., Ashland, Mass.) in about 30 grams tap water. During the winding process, a mixture having 220 grams of colloidal alumina (AL-20 available from Nyacol Nano Technologies), 44 grams spray dried colloidal alumina (AL-20SD also from Nyacol) and 14 grams silicon carbide powder (F-500 from Exolon-ESK) was applied sparingly to the peaks of the pleats to provide additional adhesion of the pleated green ceramic paper to the flat one. The resulting green ceramic fiber filter was dried for 2-3 hours at a temperature of about 150 degrees C. The amount of water can vary, depending on the viscosity desired for application of the plug material.

Preparation of Dispersions

Dispersion I—3% nano-clay dispersion: 12.0 grams (g) of powdered calcium montmorillonite nano-clay (Bentolite™SSP Nano-clay available from Southern Clay Products, Gonzales, Tex.) were dispersed in 388.0 g of deionized water in a beaker using a magnetic stir bar. Stirring was continued until the mixture was smooth and homogeneous.

Dispersion II—4% nano-clay dispersion: 16.0 g of Bentolite™SSP Nano-clay were dispersed in 384.0 g of deionized water in a beaker using a magnetic stir bar. Stirring was continued until the mixture was smooth and homogeneous.

Dispersion III—5% nano-clay dispersion: 20.0 g of Bentolite™SSP nano-clay were dispersed in 380.0 g of deionized water in a beaker using a magnetic stir bar. Stirring was continued until the mixture was smooth and homogeneous.

EXAMPLE 1

A primary dispersion was prepared by charging 87.0 g Dispersion III to a beaker and adding 13.0 g of isopropyl alcohol while stirring with a magnetic stir bar. A series of 9 cm by 9 cm green, ceramic fiber, paper coupons were impregnated by immersing the entire coupon into the primary dispersion on one side for 10 seconds, turning the coupon over and immersing it in the dispersion for an additional 10 seconds. After impregnation, the coupons were hung vertically and air dried overnight at room temperature (about 25° C.). The air dried coupons were then dried in a vented oven at 100° C. for 30 minutes, and then calcined and fired in a vented box furnace in air using the following heating sequence: room temperature to 500° C. in 3 hours; hold at 500° C. for 1 hour; heat from 500° C. to 1100° C. in 2 hours; hold at 1100° C. for 1 hour; cool in furnace to room temperature. The fired coupons are referred to as Coupon A.

EXAMPLE 2

A beaker was charged with 85.06 g of Dispersion I, and 2.18 g of silicon carbide (SiC) powder having an approximate surface area of 5 square meters per gram (UF5 SiC available from H. C. Starch, Newton Mass.) were added while stirring. The dispersion was then sonicated, i.e., ultrasonically treated, for about 3 minutes using a Branson Sonifier Cell Disruptor 350 (Branson Ultrasonics Corporation, Danbury, Conn.) fitted with a high energy, 5.1 mm titanium horn to homogenize the dispersion. The dispersion was magnetically stirred during ultrasonic treatment. Then 12.76 g of isopropyl alcohol were stirred into the dispersion to form a primary dispersion. Green ceramic paper coupons were impregnated, dried, calcined, and fired according to the procedure in Example 1. The fired coupons are referred to as Coupon B.

EXAMPLE 3

A primary dispersion was prepared according to the procedure of Example 2 except 2.18 g of a silicon carbide powder having an average particle size of about 3 micrometer (1200 black SiC available from Electro Abrasives, Buffalo, N.Y.) were used instead of UF5 SiC. Green ceramic paper coupons were impregnated, dried, calcined, and fired according to the procedure in Example 1. The fired coupons are referred to as Coupon C.

EXAMPLE 4

A primary dispersion was prepared according to the procedure of Example 3 except 2.18 g of a silicon carbide powder having an average particle size of about 2.5 micrometers (1200/F black SiC available from Electro Abrasives, Buffalo N.Y.) were used instead of the 3 micrometer SiC particles. Green ceramic paper coupons were impregnated, dried, calcined, and fired according to the procedure in Example 1. The fired coupons are referred to as Coupon D.

EXAMPLE 5

A primary dispersion was prepared according to the procedure of Example 2 using 84.68 g of Dispersion II, 2.62 g of UF5 SiC, and 12.70 g of isopropyl alcohol were used. Green, ceramic fiber, paper coupons were impregnated, dried, calcined, and fired according to the procedure in Example 1. The fired coupons are referred to as Coupon E.

EXAMPLES 6-35

Examples 6-35 were prepared by impregnating fired coupons (Coupon A-Coupon E) of Examples 1-5 with a second dispersion as noted below and in Table I. The coupons were impregnated with the second dispersion, air dried, and oven dried according to the procedures of Example 1. The dried coupons were then fired in a vented box furnace in air using the following heating sequence: room temperature to 500° C. in 2 hours; 500° C. to 1100° C. in 3 hours; hold at 1100° C. for 1 hour; cool with furnace to room temperature. The strength (indicated as peak load), stiffness, and permeability were tested and test results are shown in Table 1. The values for Peak Load and Stiffness are the average of three values.

Sol A (15% boehmite dispersion) was prepared by stirring 15.0 g of aluminum oxide monohydrate powder (Disperal™ boehmite, available from Condea Vista Co., Houston, Tex.) into 85 mls of deionized water, and then adding of 10 drops of concentrated nitric acid to the mixture to disperse the boehmite.

Soln A (15% zirconyl acetate solution) was prepared by diluting 100.0 g of a 21.4% zirconyl acetate solution (available from Magnesium Electron Inc., Flemington, N.J.) with 42.67 g of deionized water.

Sol B (30% silica dispersion) was prepared by diluting 100.0 g of a 50% solids colloidal silica having an average particle size of 60 nanometers (Nalco™1060 colloidal silica available from Nalco Chemical Co., Oak Brook Ill.) with 66.7 g of deionized water.

Sol C was prepared by stirring 5.0 g of UF5 SiC into 95.0 g of Sol A and sonicating for about 3 minutes.

Sol D was prepared by adding 5.0 g of UF5 SiC to 95.0 g of Soln A with rapid stirring and sonicating for about 3 minutes.

Sol E was prepared by adding 5.0 g of UF5 SiC to 95.0 g of Sol B with rapid stirring and sonicating for about 3 minutes.

Sol F was prepared by adding 5.0 g of UF5 SiC to 95.0 g of deionized water with rapid stirring and sonicating for about 3 minutes.

Sol G was prepared adding 2.5 g of UF5 SiC to 97.5 g of deionized water with rapid stirring and sonicating for about 3 minutes.

Sol H was prepared by adding 2.5 g of UF5 SiC to 97.5 g of Soln A with stirring and sonicating for about 3 minutes.

Sol I was prepared by adding 2.5 g of UF5 SiC to 97.5 g of Sol B and sonicating for about 3 minutes.

Sol J—A dispersion was prepared by mixing 31.15 g of Sol A, 52.7 g of Soln A, and 12.84 g of Sol B, and sonicating for 5 minutes. Then 3.3 g of UF5 SiC were added and sonicated for about 3 minutes to form Sol J.

Sol K was prepared by stirring 5.0 g of UF5 SiC into 95.0 g Dispersion II. The resulting dispersion was sonicated for about 3 minutes.

Sol L (15% colloidal silica dispersion) was prepared by diluting 100.0 g of Nalco 1060 colloidal silica with 233.3 g of deionized water.

Sol M was prepared by mixing 10 g of Sol L and 85 g of Dispersion I with rapid stirring and sonicating for about 3 minutes. Then 5.0 g of UF5 SiC powder were added with rapid stirring and sonicated for another 3 minutes to form Sol L.

Sol N was prepared by stirring 2.5 g of UF5 SiC powder into 97.5 g of Sol B and sonicating for about 3 minutes.

Sol O—A dispersion was prepared by stirring 2.5 g of ElectroAbrasive 1200 black SiC powder to 87.5 g of Dispersion I and sonicating for about 3 minutes. Then 10.0 g of Sol L were added with rapid stirring to the nano-clay/silicon carbide dispersion and sonicated for another 3 minutes.

Sol P was prepared according to the procedure for Sol O using 5.0 g of 1200 black SiC powder, 85 g of Dispersion I, and 10 g of Sol L.

Sol Q was prepared according to the procedure for Sol O using 7.5 g of 1200 black SiC powder, 82.5 g of Dispersion I, and 10 g of Sol L.

Sol R was prepared according to the procedure for Sol O using 10.0 g of 1200 black SiC powder, 80.0 g of Dispersion I, and 10 g of Sol L.

Sol S was prepared according to the procedure for Sol O using 12.5 g of 1200 black SiC powder, 77.5 g of Dispersion I, and 10 g of Sol L.

Sol T was prepared according to the procedure for Sol O using 15.0 g of 1200 black SiC powder, 75.0 g of Dispersion I, and 10 g of Sol L.

Sol U was prepared according to the procedure and materials for Sol O except that 1200/F black SiC powder was used.

Sol V was prepared according to the procedure and materials for Sol P except that 1200/F black SiC powder was used.

Sol W was prepared according to the procedure and materials for Sol Q except that 1200/F black SiC powder was used.

Sol X was prepared according to the procedure and materials for Sol R except that 1200/F black SiC powder was used.

Sol Y was prepared according to the procedure and materials for Sol S except that 1200/F black SiC powder was used.

Sol Z was prepared according to the procedure and materials for Sol T except that 1200/F black SiC powder was used.

TABLE 1

| Ex | Coupon | Second Impregnating Dispersion | Avg Peak Load (grams) | Stiffness (N/mm) | Permeability (cc/sec/cm²) |
|---|---|---|---|---|---|
| 6 | A | Sol A | 110.18 | 3.49 | 12.78 |
| 7 | A | Soln A | 146.48 | 5.30 | 14.06 |
| 8 | A | Sol B | 540.84 | 20.84 | 8.44 |
| 9 | A | Sol C | 215.83 | 10.82 | 11.25 |
| 10 | A | Sol D | 227.57 | 9.43 | 9.97 |
| 11 | A | Sol E | 677.79 | 24.77 | 8.69 |
| 12 | A | Sol F | 230.99 | 8.53 | 17.13 |
| 13 | A | Sol G | 215.93 | 9.93 | 11.76 |
| 14 | A | Sol H | 162.27 | 6.70 | 11.50 |
| 15 | A | Sol I | 542.94 | 22.83 | 8.69 |
| 16 | A | Sol J | 219.29 | 9.10 | 9.46 |
| 17 | A | Dispersion III | 272.38 | 9.77 | 18.15 |
| 18 | A | Sol K | 368.27 | 13.46 | 13.81 |
| 19 | B | Sol L | 298.49 | 13.16 | 10.48 |
| 20 | B | Sol M | 296.82 | 13.80 | 10.48 |
| 21 | B | Sol C | 228.87 | 11.36 | 9.20 |
| 22 | B | Sol K | 360.28 | 15.54 | 10.23 |
| 23 | C | Sol O | 173.09 | 8.21 | 16.36 |
| 24 | C | Sol P | 209.48 | 9.26 | 14.57 |
| 25 | C | Sol Q | 195.57 | 9.04 | 12.78 |
| 26 | C | Sol R | 246.37 | 11.74 | 11.89 |
| 27 | C | Sol S | 297.16 | 14.72 | 9.97 |

TABLE 1-continued

| Ex | Coupon | Second Impregnating Dispersion | Avg Peak Load (grams) | Stiffness (N/mm) | Permeability (cc/sec/cm²) |
|---|---|---|---|---|---|
| 28 | C | Sol T | 345.88 | 17.37 | 9.46 |
| 29 | D | Sol U | 274.08 | 12.94 | 13.68 |
| 30 | D | Sol V | 301.99 | 13.74 | 12.78 |
| 31 | D | Sol W | 300.41 | 14.79 | 10.99 |
| 32 | D | Sol X | 322.60 | 15.86 | 10.23 |
| 33 | D | Sol Y | 348.64 | 16.98 | 8.44 |
| 34 | D | Sol Z | 385.43 | 19.16 | 7.16 |
| 35 | E | Sol K | 384.85 | 17.32 | 7.41 |

The data in Table I show that the finished coupons had properties that indicate the fired materials are suitable for a filter. Particularly suitable examples have both relatively high strength and relatively high permeability.

EXAMPLE 36

A 5% nano-clay dispersion was prepared by dispersing 70.0 g of Bentolite™SSP nano-clay in 1330.0 g of deionized water. Then 210 g of isopropyl alcohol were added and mixed until homogeneous to form a primary dispersion.

A green ceramic fiber filter prepared according to the above-described procedure, was placed in a 19 cm by 10 cm bowl with one of the flat ends pointed down. About half of the primary dispersion was poured over the top of the filter in a circular manner beginning from the center. The filter was turned over, and the remainder of the primary dispersion was poured onto the filter in the same manner, allowing the entire filter to be penetrated by the dispersion. The excess dispersion was removed by gently shaking the filter and draining it on paper towels. The filter was turned over every hour and air dried at ambient temperature for a total of 4 hours. The air-dried filter was further dried in an oven at 99° C. for 12 hours. The filter was calcined and fired according to the following heating sequence: 2 hours from ambient temperature to 200° C.; hold for 2 hours at 200° C.; 2 hours to 250° C.; 250° C. for 2 hours; 2 hours to 350° C.; hold at 350° C. for 2 hours; 2 hours to 400° C.; hold at 400° C. for 2 hours; 2 hours to 450° C.; hold at 450° C. for 2 hours; 2 hours to 500° C.; hold at 500° C. for 0.5 hour; 1 hour to 1000° C., and then hold at 1000° C. for 0.5 hour. The filter was allowed to cool with the furnace. The filter was not intentionally cooled between the calcining and subsequent firing process.

After firing, the filter was rigid, lightweight, and fairly strong. A dispersion was prepared by dispersing 144 g of boehmite particles (Disperal™ boehmite) in 818 g of deionized water using 3.5 mls of concentrated nitric acid as a dispersant. 160 grams of Sol L was acidified with 0.8 mls of concentrated nitric acid and added to the boehmite dispersion with rapid stirring. After mixing, 480 g of Soln A added and stirred to homogenize. The resulting dispersion, containing the boehmite, colloidal silica, and zirconyl acetate was impregnated into the once impregnated and fired filter in a manner similar to the first impregnation. The impregnated filter was air dried for 4 hours, dried in an oven at 99° C. overnight, and then cooled to room temperature.

An edge-coating dispersion was prepared by adding 178.5 g of aluminum oxide powder (Alcoa™ SG15 alumina available from Alcoa Industrial Chemicals, Bauxite, Ariz.) to 86.6 g of deionized water and mixing to form a thick mixture. Then 1.45 g of a dispersant (Darvan™C dispersant available from R. T. Vanderbuilt Company, Incorporated, Norwalk, Conn.) were added, followed by the addition of 3.75 g of a 39.7% sodium silicate solution having an $SiO_2/Na_2O$ ratio of 2.75 (PD Sodium Silicate available from PQ Corp., Valley Forge, Pa.). The dispersants thinned the mixture, and 19.83 g of zirconium oxide powder were added. The mixture was treated with a high energy sonifier for 13 minutes. Then 5.95 g of ethylene glycol were added and mixed.

The edge coating was applied by dipping the flat edges of the impregnated and dried ceramic fiber filter into the edge coating dispersion to a depth of about 0.6-1.0 cm. After applying the edge coating dispersion to both edges of the filter, the filter was shaken gently to remove excess coating and air was blown into the coated ends to ensure that the dispersion did not block the channels. The edge-coated filter was dried in air at ambient temperature for about 2 hours, further dried in an oven at 99° C. for 4 hours, and then calcined and fired according to the following sequence: 3 hours from 100° C. to 500° C.; hold at 500° C. for 1 hour; 500° C. to 1000° C. in 2 hours; hold at 1000° C. for 0.5 hour; and cooled with the furnace.

The finished filter was mounted in a metal can and tested for efficiency according to the above test method. At 20 kPa pressure drop, the efficiency in removing the particulate exhaust material was found to be 95.9% efficient. At 40 kPa pressure drop, the efficiency in removing particulate exhaust material was found to be 95.1%.

EXAMPLE 37

A dispersion was prepared by mixing 1400.0 g of Dispersion I with 35.9 g of UF5 SiC powder with a stir bar and then sonicating for 15 minutes. Then 210 g of isopropyl alcohol were added and stirred with a magnetic stirrer to form a homogeneous primary dispersion. A green ceramic fiber filter was formed, impregnated with the dispersion, and dried according to the procedure described in Example 36. The filter was then calcined and fired according to the following sequence: hold for 2 hours at 100° C.; 100° C. to 500° C. in 4 hours; hold at 500° C. for 3 hours; 500° C. to 1000° C. in 2 hours; and hold at 1000° C. for 0.5 hour; and then cool with the furnace.

After the initial impregnation and firing the filter was light in weight but strong. A second impregnation dispersion was prepared by mixing 1156 g of a Dispersion I with 68.0 g of UF5 SiC and 136.0 g of a Sol L. After mixing, the dispersion was sonicated for 15 minutes while stirring to produce a homogeneous mixed particle dispersion. The impregnated, calcined and fired ceramic fiber filter was impregnated a second time and dried as described in Example 36.

An edge coating dispersion was prepared by dispersing 535.5 g of Alcoa 15SG alumina with rapid stirring in 252.0 g of deionized water and adding of 4.35 g of Darvan C, then adding 11.25 g of PD sodium silicate. Then 59.49 g of zirconium oxide powder and 20.3 g of UF 5 SiC were added and the mixture was sonicated while stirring for 20 minutes. Then 17.85 mls of ethylene glycol were added and stirred until homogeneous. The dried, twice impregnated filter was edge coated using this dispersion according to the procedure of Example 36. After drying, the edge-coated filter was dried, calcined, and fired according to the following sequence hold at 100° C. for 2 hours; heat from 100° C. to 500° C. in 3 hours; hold at 500° C. for 1 hour; heat from 500° C. to 1100° C. in 2 hours; hold at 1100° C. for 0.5 hour; then cool with the furnace.

The finished ceramic fiber filter was tested according to the Efficiency and Soot Holding Method. The results showed that at a pressure drop of 20 kPa, the efficiency was 99.4% and the soot holding was 11.0 grams. At a pressure drop of 40, the efficiency was 96.1% and the soot-holding was 34.0 g.

EXAMPLE 38-42

Examples 38-42 illustrate different penetrating agents useful in the first impregnation. A dispersion was prepared by dispersing 2.93 parts of Bentolite™SSP nano-clay and 2.5 parts of silicon carbide powder (1200 black SiC from ElectroAbrasives) in 94.58 parts of deionized water and sonicating to form a homogeneous dispersion. A penetrating agent was mixed into the dispersion to form a primary dispersion.

For Example 38, 26.0 g of isopropyl alcohol were mixed with 200.0 g of the dispersion to form a primary dispersion.

For Example 39, 10.0 g of Tergitol™TMN10 (Union Carbide, Danbury, Conn.) were added and mixed with 1600 g of the dispersion to form a primary dispersion.

For Example 40, 3.58 g of Aerosol OT-S (70%) (Cytec Industries, Inc., West Paterson, N.J.) were added and mixed with 1600 g of the dispersion to form a primary dispersion.

A 9 cm by 9 cm coupon of green, ceramic fiber paper, described above, was impregnated by totally immersing the coupon into the primary dispersion. The impregnated paper was removed from the impregnating solution bath, hung vertically, and allowed to air dry for 2 hours at ambient temperature (approximately 23° C.). The coupon was transferred to an oven at 100° C. and dried overnight.

For Examples 41-42, the remainder of the impregnation solutions for Examples 39 and 40 were used to impregnate green ceramic fiber filters for Examples 41 and 42, respectively, by pouring the impregnation solution into and through the filters until they were totally saturated. The filters were turned over and the process was repeated. The impregnated filters air dried for 24 hours at ambient temperature and then dried in an oven at 85° C. for 24 hours.

The three impregnated test coupons of Examples 38-40 and the two impregnated, green ceramic fiber filters of Examples 41 and 42 were calcined and fired in a large box furnace according to following heating sequence: from room temperature to 250° C. in 1 hour; hold at 250° C. for 5 minutes; from 250° C. to 270° C. in 3 hours; hold at 270° C. for 3 hours; from 270° C. to 300° C. in 2 hours; from 300° C. to 450° C. in 1 hour; hold at 450° C. for 2 hours; from 450° C. to 1000° C. in 2 hours; hold at 1000° C. for 15 minutes; cool with the furnace. The samples were removed after the temperature had fallen below about 200° C.

A second impregnation dispersion was prepared by dispersing and mixing 185.0 g of Bentolite™ SSP nano-clay and 375.0 g of ElectroAbrasives 1200/F black silicon carbide in 4440 g of deionized water. The fired test coupons of Examples 38-40 and the fired ceramic fiber filters of Examples 41-42 were impregnated a second time with this dispersion. The samples were air dried for about 2 hours at ambient temperature and then dried in the oven at 85° C. overnight. The samples were then calcined and fired according to the following sequence: from room temperature to 85° C. in 15 minutes; hold at 85° C. for 2 hours; from 85° C. to 500° C. in 2 hours; hold at 500° C. for 1 hour; from 500° C. to 1100° C. in 3 hours; hold at 1100° C. for 1 hour; then cool with the furnace. The samples were removed from the furnace after the furnace temperature had fallen below 200° C.

The fired ceramic filters of Examples 41 and 42 were edge coated and fired according to the procedure in Example 37.

The coupons from Examples 38-40 were tested for permeability and strength and results are shown in the Table II.

TABLE II

| Ex | Penetrating Agent | Peak Load (gram) | Stiffness (N/mm) | Permeability (cc/sec/cm²) |
|----|-------------------|------------------|------------------|---------------------------|
| 38 | Isopropyl alcohol | 230.9 | 10.84 | 15.3 |
| 39 | Tergitol TMN 10 | 326.0 | 12.63 | 2.55 |
| 40 | Aerosol OT-S | 224.5 | 11.12 | 16.32 |

The ceramic fiber filters for Examples 41 and 42 were tested for efficiency in removing diesel exhaust particulate matter using the method described in Example 36. The results are summarized in Table III

TABLE III

| | | Efficiency | | Soot Holding (grams) | |
|---|---|---|---|---|---|
| Ex | Penetrating Agent | @ 10 kPa | @ 20 kPa | @ 20 kPa | @ 40 kPa |
| 41 | Tergitol TMN 10 | 90% | 88.5% | 13.0 | 27.5 |
| 42 | Aerosol OT-S | 95% | 97.5% | 12.5 | 32.0 |

EXAMPLE 43-44

Finished filters were prepared according to the procedure in Example 36 up until the preparation for the edge coating except that the second impregnation step used the different dispersions described below for Examples 43-44. The filters were edge coated using the dispersion, and the drying and firing sequence according to Example 37. The finished filters were tested efficiency and soot holding, and results are shown in Table IV.

Example 43—A second impregnation dispersion was prepared by mixing 1400 g of Sol L with 35.9 g of UF5 SiC powder, and sonicating for 15 minutes while stirring.

Example 44—A second impregnation dispersion was prepared by dispersing 210.0 g of Disperal™ boehmite in 1190 g of deionized water and adding 5.18 ml of concentrated nitric acid while rapidly stirring. Then 73.68 g of UF5 SiC powder were added and the dispersion was sonicated for about 20 minutes.

EXAMPLE 45

A primary dispersion was prepared by dispersing 52.0 g of Bentolite™SSP nano-clay with 40.2 g of UF5 SiC in 1248 g of deionized water, sonicating for 20 minutes to homogenize and then adding 195 g of isopropyl alcohol. A green ceramic fiber filter was impregnated with the dispersion, dried, calcined, and fired according to the procedure in Example 36. A second impregnation dispersion was prepared by dispersing 57.0 g of Bentolite SSP nano-clay with 75.0 g of UF5 SiC in 1368 g of deionized water. The mixture was sonicated for 20 minutes to homogenize the dispersion. The impregnated, dried and fired filter element was impregnated with the second impregnation dispersion, dried, edge-coated, dried and fired according to the procedure in Example 36. Test results for efficiency are shown in Table IV.

EXAMPLE 46

A primary dispersion was prepared by adding 195 g of isopropyl alcohol to 2600 grams of Dispersion III. A green filter element was impregnated with this dispersion, dried, calcined, and fired according to the procedure in Example 36. The filter was then impregnated a second time with Dispersion III, dried, edge coated, dried, calcined, and fired according to Example 45. Testing for efficiency and soot holding are shown in Table IV.

EXAMPLE 47

A primary dispersion was prepared by dispersing 42.0 g of Bentolite SSP nano-clay and 35.9 g of UF5 SiC in 1358 g of deionized water. The dispersion was sonicated for 20 minutes to homogenize, and 224 g of isopropyl alcohol were added and mixed thoroughly. A green filter was impregnated with the resulting dispersion, dried, calcined, and fired according to the procedure of Example 36. A second impregnation dispersion was prepared by dispersing 35.7 g of Bentolite SSP nano-clay and 70.0 g of 1200/F black SiC in 1154.3 g of deionized water. The dispersion was sonicated for 20 minutes to homogenize, and 140.0 g of Sol L were added and mixed. The once fired filter was impregnated with the dispersion, dried, edge-coated, and dried, calcined, and fired according to the procedure in Example 45.

EXAMPLE 48

A primary dispersion having 2.55% Bentolite SSP nano-clay, 2.18% UF5 SiC and 12.76% isopropyl alcohol was prepared according to Example 47. A green filter was impregnated by immersing the filter into the dispersion three times. During immersion, the filter was turned to allow the air to escape from the filter channels. Excess dispersion was drained from the filter, and the filter was dried, calcined and fired according to the procedure in Example 36.

A second impregnation dispersion was prepared by mixing 1400 g of Sol L with 35.9 g of UF5 SiC powder and sonicating for 15 minutes while stirring to homogenize. The filter was impregnated with the resulting dispersion and dried according to the procedure in Example 36. An edge coating mixture was prepared by dispersing 400.0 g of Alcoa 15SG alumina and 62.5 g of 1200/F black SiC in 196.7 g of deionized water using 62.5 g of PD sodium silicate solution and 3.58 g of Darvan C according to the procedure in Example 37. 7.5 mls of ethylene glycol were added as a drying modifier. The dried filter was edge-coated using this edge-coating dispersion and then dried, calcined, and fired according to the procedure in Example 37.

TABLE IV

| | Efficiency - % | | Soot Holding (grams) | |
|---|---|---|---|---|
| Ex | @ 20 kPa | @ 40 kPa | @ 20 kPa | @°40 kPa |
| 43 | 100 | 93.9 | 9.5 | 35.5 |
| 44 | 95.8 | 98.4 | nt | nt |
| 45 | 95.8 | 76.3 | nt | nt |
| 46 | 90.5 | 80.0 | 13.5 | 34 |
| 47 | 89.5 | 94.2 | 14.5 | 30.5 |
| 48 | 92.7 | 93.7 | 11.0 | 33.5 | nt = not tested

EXAMPLE 49

A green ceramic filter was prepared according to the above described procedure except that the following plug material was used. The plug material was prepared by mixing 35.97 g of water with 142.24 g of alumina (A3000FL-Al₂O₃ available from Alcoa) by hand stirring to disperse the alumina. Then 4.14 g of kaolin fiber and 2.52 g of mullite fiber were mixed in. After adding 71.62 g of silica sol (Nalco™ 1050) the mixture was shear mixed with a Cowles blade apparatus at a speed of about 29 inches/sec (73.7 cm/sec). During the shearing 19.74 g of A3000FL alumina and 31.98 g $Al_2TiO_5$ particles were added. Afterwards, alumina and silicon carbide particles were slowly added in batches as follows: 37.62 g A3000FL alumina, then 21.88 g A3000FL alumina, and then 36.15 g of green SiC. Finally, 5.3 g of blown soybean oil was added. The soybean oil appears to act as a lubricant for the particles. The mixture was then sheared with the Cowles blade at about 10 to 20 inches/sec (38 to 51 cm/sec) for about 10 minutes. The resulting viscosity was between about 3500 to 3920 cps. The viscosity can be further modified as needed by adding, dropwise, water to reduce it or blown soybean oil to raise it. After coating on the paper, the plug material was dried slowly to avoid cracking.

The percentage composition of the plug material is approximately as follows:

| | |
|---|---|
| $Al_2O_3$ | 55% |
| Water | 17% |
| Fiber | 1.6% |
| $Al_2TiO_5$ | 7.9% |
| SiC | 8.9% |
| $SiO_2$ (in Nalco sol) | 8.8% |
| Blown soybean oil | 1.3% |

A critical characteristic of the inventive ceramic fiber based wall flow substrate or filter is its capability to filter out very small particles efficiently. It is widely known that in the diesel exhaust stream, the very small particles, often called nano-particles, are the most dangerous in terms of health hazards (see for example: D. Warheit, W. Seidel, M. Carakostas and M. Hartsky, "Attenuation of Perfluoropolymer Fume Pulmonary Toxicity: Effect of Filters, Combustion Method and Aerosol Age" Pulmonary Toxicity of Perfluropolymer Fumes, Academic Press, pp. 309-329, 1990). The present inventive filter can be made, via the process herein disclosed, so as to exhibit a higher nano-particle filtration efficiency than was previously possible. The present filters can filter out greater than about 97%, and even greater than about 98%, of the smaller particles (i.e., those less than 150 nms in diameter) found in a diesel exhaust. The present inventive filter can also be made, as herein disclosed, to filter out greater than about 98%, preferably greater than about 99%, and more preferably greater than about 99.5% of the very small particles (i.e., those with diameters between 10 and 20 nms) found in a diesel exhaust. The present inventive wall flow substrate can perform similarly as a filter in other particulate exhaust streams.

Nano-particle filtration efficiency was measured by the method of Liu et al (Z. G. liu, B. M. Verdegan, K. M. A. Badeau and T. P. Sonsalla, SAE Technical Paper 2002-010-1007) using a 2000 model year Cummin's ISB diesel engine with direct injection using an electric dynamometer to control engine torque and speed. The engine was run at ISO 8178 modes. The filter of the present invention was characterized using this technique. A commercially available Corning 100 dpi cordierite filter was also tested in this manner, for comparison (Corning Incorporated, Corning, N.Y.). In this test, the efficiency of the filter was tested with regard to particulate particle size. For small particle sizes (in the range of 10-150 nms), the inventive filter averaged greater than about 99% efficiency and for the very small particle sizes (between 10-20 nms), the inventive filter averaged greater than about 99.5% efficiency. The commercially available Corning filter averaged less than 96.5% efficiency between 10-150 nms and less than 90% efficient for the very small particle sizes.

The inventive ceramic fiber-based wall flow substrate or filter can be heated up very rapidly and cooled down very rapidly. In use, a filter for a diesel engine exhaust will generally accumulate carbonaceous soot that will require periodic removal via oxidation. Oxidation catalysts can be used to lower the temperature at which the soot will begin to burn but even with the use of oxidation catalysts, additional heat may need to be added to induce soot oxidation. Since the addition of heat by an external source requires the expenditure of energy, it is desirable for the filter to heat up very rapidly when exposed to hotter exhaust gas or when heated externally so as to minimize the energy expenditure required to remove the soot. The ceramic fiber based wall flow substrates described herein can have a very rapid thermal response. The thermal response of the filter can be, desirably, greater than 1.8° C./second, preferably, greater than 2.0° C./second and, more preferably, greater than 2.3° C./second.

The thermal response of the ceramic fiber based filter of the present invention and two other commercially available filters (Ibiden Corporation, Ogaki City, Japan SiC 200 filter and a Corning, Corning, N.Y., Cordierite 200 filter) were measured as follows:

A 5.66"×6" composite filter was sleeved in a metallic housing, provided by Fleetguard Inc. of Stoughton, Wis., using a mounting mat supplied by 3M Company of St. Paul, Minn. (Interam 1101 HT, 1540 g/$M^2$). The sleeved filter assembly was connected to the exhaust pipe downstream of a Cummins 3.41 IDI industrial diesel engine. The filter was loaded with soot to a pressure drop of 20 kPa by running the engine at 2400 rpm/12.4 MPa. Once the target pressure drop was achieved, the exhaust gas was by-passed around the sleeved filter assembly. Hot air is then introduced into the filter by passing 0.85 cubic meters per minute (i.e., 30 standard cubic feet per minute) of room air through an Osram Sylvannia Products Inc. Sureheat 072781 process heater supplied by Pyromatic Incorporated (Wauwatosa, Wis.). In this configuration, the process heater is located upstream of the sleeved filter assembly. The heater control is set to 700° C. and measured at the outlet of the process heater. After the outlet temperature reaches 600-650° C., the heater air is passed through the sleeved filter assembly and is run for 20 minutes. Filter temperature is monitored from the downstream end of the filter by inserting a Type K Omega (Omega Instruments, Inc., Stamford, Conn.) thermocouples 7.6 cm deep into the center of the filter. Filter temperature and sleeved filter assembly pressure drop is monitored throughout the test. A plot of temperature versus time for the inner portion of the filter yields a graph that displays the heat-up characteristics of the filter. The change in temperature versus time for the first 181 seconds provides a measure of the heat up rate. The ceramic fiber based filter heated up at a rate of 2.36° C./second, the SiC 200 filter heated up at a rate of 1.00° C./second, and the Cordierite 200 filter heated up at a rate of 1.73° C./second. A more rapid heat up rate such as is exhibited by the inventive filter is desired so that the filter will be able to regenerate with a lower energy penalty.

The present inventive ceramic fiber-based substrate can exhibit a high push out strength. A common mode of failure in filter substrates made from wound pleated paper is commonly called push-out or telescoping. In this failure, an interior portion of the filter separates from an exterior portion of the filter allowing the interior portion to push-out or telescope in the direction of the air flow. The ceramic fiber-based wall-flow substrates as described herein can be made to have high push-out strengths, e.g., higher than 0.275 MPa. Such a high push out strength is desirable for a durable, long-lasting filter for diesel engine exhausts.

It can be desirable to harden the outside end surfaces (i.e., that are exposed to the exhaust flowing through the substrate) of the present substrate. This hardening can be accomplished by using a separate coating on the end surfaces. It is believed that such hardening can improve the strength, wearability and/or surface coefficient of friction of the end surface. The materials used for this coating can be the same type of materials used to rigidify the substrate paper. These coating materials preferably include a hard phase (e.g., alpha alumina), durable phases (e.g., zirconia), mullite materials, cordierite materials, silicon or other carbides that can be bonded together with clays, colloidal silica (with or without colloidal alumina), colloidal alumina and mixtures of particles. Penetrating agents can be used, if desired. Similar coating materials can be used on the outer tubular surface of the substrate to improve the crush strength of the substrate and, thereby, enable higher pressure-exerting mounting mats to be used.

Various modifications and alterations of this invention will become apparent to those skilled in the art without departing from the scope and spirit of this invention and it should be understood that this invention is not to be limited to the illustrative embodiments set forth herein.

The invention claimed is:

1. Chemically stabilized β-cristobalite comprising pyrolyzed montmorillonite, wherein said chemically stabilized β-cristobalite is stable below about 265° C.

2. A method of making a chemically stabilized β-cristobalite according to claim 1, said method comprising:
    heating montmorillonite to a firing temperature and for a time sufficient to convert the montmorillonite to chemically stabilized β-cristobalite,
    wherein the chemically stabilized β-cristobalite is stable below about 265°C.

3. The method according to claim 2, wherein said heating is at a temperature of about 900° C.

4. The method according to claim 2, further comprising:
    introducing the montmorillonite into a sol-gel composition or mixed dispersion before said heating.

5. The method according to claim 3, further comprising:
    introducing the montmorillonite into a sol-gel composition or mixed dispersion before said heating.

6. The method according to claim 2, further comprising:
    combining montmorillonite with glass precursor material,
    wherein said heating further comprises beating the combination of montmorillonite and glass precursor materials to a temperature and for a time sufficient to convert the combination of montmorillonite and glass precursor material to a chemically stabilized β cristobalite glass.

7. The method according to claim 3, further comprising:
    combining montmorillonite with glass precursor material,
    wherein said heating further comprises heating the combination of montmorillonite and glass precursor materials to a temperature and for a time sufficient to convert the combination of montmorillonite and glass precursor material to a chemically stabilized β cristobalite glass.

8. The method according to claim 4, further comprising:
    combining montmorillonite with glass precursor material,
    wherein said heating further comprises heating the combination of montmorillonite and glass precursor materials to a temperature and for a time sufficient to convert the combination of montmorillonite and glass precursor material to a chemically stabilized β cristobalite glass.

9. The method according to claim 5, further comprising:
    combining montmorillonite with glass precursor material,
    wherein said heating further comprises heating the combination of montmorillonite and glass precursor materials to a temperature and for a time sufficient to convert the combination of montmorillonite and glass precursor material to a stabilized β cristobalite glass.

10. The method according to claim 2, wherein the montmorillonite includes a calcium montmorillonite.

11. The method according to claim 3, wherein the montmorillonite includes a calcium montmorillonite.

12. The method according to claim 4, wherein the montmorillonite includes a calcium montmorillonite.

13. The method according to claim 6, wherein the montmorillonite includes a calcium montmorillonite.

14. The method according to claim 10, wherein the calcium montmorillonite has been ion-exchanged with other cations, and said heating further comprises heating the ion-exchanged montmorillonite to a temperature and for a time sufficient to convert the ion-exchanged montmorillonite to a chemically stabilized β cristobalite having a composition that is different than a chemically stabilized β cristobalite formed from calcium montmorillonite that has not be ion-exchanged with other cations.

15. The method according to claim 2, wherein the montmorillonite has been ion-exchanged, and said heating further comprises heating the ion-exchanged montmorillonite to a temperature and for a time sufficient to convert the ion-exchanged montmorillonite to a chemically stabilized β cristobalite having a composition that is different than a chemically stabilized β-cristobalite formed from montmorillonite that has not be ion-exchanged.

16. The method according to claim 2, wherein the chemically stabilized β-cristobalite is stable at room temperature.

17. The method according to claim 2, further comprising:
    combining the montmorillonite with a glass precursor material, before said heating,
    wherein the chemically stabilized β-cristobalite is a chemically stabilized β-cristobalite glass.

18. The chemically stabilized β-cristobalite according to claim 1, wherein said chemically stabilized β-cristobalite has a lattice structure and comprises a sufficient level of non-silicone cations substituted and stuffed into said lattice structure such that said chemically stabilized β-cristobalite is stable at room temperature.

19. The chemically stabilized β-cristobalite according to claim 1, wherein said chemically stabilized β-cristobalite acts as a basic oxide.

20. The chemically stabilized β-cristobalite according to claim 1, wherein said chemically stabilized β-cristobalite is a chemically stabilized β-cristobalite glass comprising said pyrolyzed montmorillonite in combination with a pyrolyzed glass precursor material.

21. A ceramic body comprising the chemically stabilized β-cristobalite according to claim 1.

22. The ceramic body according to claim 21, wherein said ceramic body is a ceramic fiber-based paper comprising:
    ceramic fibers; and
    agglomerates of ceramic particles bonded to and disposed so as to thereby bond together said ceramic fibers, said agglomerates of ceramic particles comprising said chemically stabilized β-cristobalite.

23. A rigidified ceramic fiber-based paper substrate suitable for use in an exhaust system of a combustion device, said paper substrate comprising:
    a ceramic fiber-based paper according to claim 22, wherein said ceramic fibers comprise refractory ceramic fibers.

24. The rigidified ceramic fiber-based paper substrate as set forth in claim 23, wherein said montmorillonite clay is a calcium montmorillonite clay.

25. The rigidified paper substrate as set forth in claim 23, wherein lenticular or plate-like pores are present inside said paper, with said pores being aligned close to parallel with the plane of said paper.

26. The rigidified paper substrate as set forth in claim 25, wherein said pores have long axes in the range of from about 50 to about 300 micrometers in length and in the range of from about 10 to about 50 micrometers in height.

27. The rigidified paper substrate as set forth in claim 23, wherein said substrate is at least one of a wall-flow substrate and a flow-through substrate.

28. The rigidified paper substrate as set forth in claim 23 in combination with a mounting material and a housing, wherein said substrate is at least one of a wall-flow substrate and a flow-through substrate, said substrate is disposed in said housing, and said mounting material is positioned between said substrate and said housing so as to form a substrate assembly.

29. The substrate assembly as set forth in claim 28 in combination with a combustion device having an exhaust system, wherein said substrate assembly is disposed in said exhaust system.

30. The rigidified paper substrate as set forth in claim 23, wherein said substrate is at least one of a filter element and a catalyst support suitable for use in an internal combustion engine exhaust system.

31. The rigidified paper substrate as set forth in claim 23, wherein greater than about 60% of said refractory ceramic fibers in said paper are aligned within about 35° of being parallel with the plane of said paper.

32. The rigidified paper substrate as set forth in claim 23, further comprising a durable ceramic coating disposed so as to harden an exterior surface of said substrate against exposure to exhaust gases passing through said substrate that contact said exterior surface, when said substrate is used in an exhaust system of a combustion device.

33. The rigidified paper substrate as set forth in claim 23, further comprising a durable ceramic coating disposed so as to increase the crush strength of an exterior surface of said substrate, wherein said exterior surface is exposed to mounting pressures, when said substrate is mounted in an exhaust system of a combustion device.

34. The rigidified paper substrate as set forth in claim 23, wherein said substrate is at least an exhaust gas filter, and said substrate is able to filter out greater than about 97% of exhaust particulate having a diameter of less than 150 nms.

35. The rigidified paper substrate as set forth in claim 23, wherein said refractory ceramic fibers have exposed surfaces between said agglomerates of ceramic particles.

* * * * *

UNITED STATES PATENT AND TRADEMARK OFFICE
CERTIFICATE OF CORRECTION

PATENT NO. : 7,404,840 B2
APPLICATION NO. : 10/483035
DATED : July 29, 2008
INVENTOR(S) : Thomas E. Wood It is certified that error appears in the above-identified patent and that said Letters Patent is hereby corrected as shown below:

Column Page 2 Col. 2 (Other Publications)
Line 2, After "GB," insert -- Class E36 --.

Column 4
Line 66, After "silica" insert -- . --.

Column 16
Line 7, After "with" delete "a".
Line 9, After "such" delete "a".

Column 18
Line 44, Delete "quartenary" and insert -- quaternary --, therefor.
Line 51, Delete "funtionality" and insert -- functionality --, therefor.

Column 19
Line 61, Delete "subtrate" and insert -- substrate --, therefor.

Column 22
Line 2 (Table), Delete "Perent" and insert -- Percent --, therefor.
Line 6, Delete "Na2O" and insert -- $Na_2O$ --, therefor. (First Occurrence)
Line 6, Delete "Na2O" and insert -- $Na_2O$ --, therefor. (Second Occurrence)
Line 50 (Approx.), After "$K_2O$)" insert -- . --.
Line 60, Delete "Glass-Cermaics" and insert -- Glass-Ceramics --, therefor.

Column 24
Line 32, Delete "nonoclay" and insert -- nano-clay --, therefor.

Column 31
Line 26, Delete "Minn.))" and insert -- Minn.) --, therefor.
Line 55, Delete "$US_{scooted}$–" and insert -- $US_{sooted}$– --, therefor.

Column 39
Line 13, After "III" insert -- . --.

UNITED STATES PATENT AND TRADEMARK OFFICE
CERTIFICATE OF CORRECTION

PATENT NO. : 7,404,840 B2
APPLICATION NO. : 10/483035
DATED : July 29, 2008
INVENTOR(S) : Thomas E. Wood It is certified that error appears in the above-identified patent and that said Letters Patent is hereby corrected as shown below:

<u>Column 41</u>
Line 37, Delete "Perfluropolymer" and insert -- Perfluoropolymer --, therefor.

<u>Column 42</u>
Line 29, Delete "Interam" and insert -- Interam™ --, therefor.

<u>Column 44</u>
Line 5, In Claim 9, After "to a" insert -- chemically --.
Line 22 (Approx.), In Claim 14, delete "be" and insert -- been --, therefor.
Line 30 (Approx.), In Claim 15, delete "be" and insert -- been --, therefor.

<u>Column 45</u>
Line 2, In Claim 24, after "montmorillonite" delete "clay".

Signed and Sealed this

Twenty-sixth Day of May, 2009

JOHN DOLL
*Acting Director of the United States Patent and Trademark Office*